(12) United States Patent
Rinne et al.

(10) Patent No.: US 10,913,075 B2
(45) Date of Patent: Feb. 9, 2021

(54) FLOTATION ARRANGEMENT

(71) Applicant: OUTOTEC (FINLAND) OY, Espoo (FI)

(72) Inventors: Antti Rinne, Espoo (FI); Peter Bourke, West Perth (AU)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 16/536,649

(22) Filed: Aug. 9, 2019

(65) Prior Publication Data

US 2020/0061636 A1 Feb. 27, 2020

Related U.S. Application Data

(63) Continuation of application No. PCT/FI2018/050107, filed on Feb. 14, 2018.

(30) Foreign Application Priority Data

Feb. 15, 2017 (WO) .................. PCT/FI2017/050094

(51) Int. Cl.
*B03D 1/14* (2006.01)
*B03D 1/08* (2006.01)
(Continued)

(52) U.S. Cl.
CPC ............ *B03D 1/1406* (2013.01); *B03D 1/087* (2013.01); *B03D 1/24* (2013.01); *C22B 1/00* (2013.01);
(Continued)

(58) Field of Classification Search
CPC ...... B03D 1/082; B03D 1/087; B03D 1/1406; B03D 1/24; B03D 2203/025;
(Continued)

(56) References Cited

U.S. PATENT DOCUMENTS 2,399,845 A * 5/1946 Allen ...................... B03D 1/02
209/167
3,067,957 A * 12/1962 Erck ........................ B03B 9/00
241/23
(Continued)

FOREIGN PATENT DOCUMENTS

AU 2016204951 A1 2/2017
CL 2019000408 U1 5/2019
(Continued)

OTHER PUBLICATIONS

Flotación de Sulfuros de Cobre (https://www.911metallurgist.com/metalurgia/flotacion-de-sulfuros-de . . . 2) dated Oct. 23, 2016 (10 pages) along with English translation (1 page).
(Continued)

*Primary Examiner* — Joseph C Rodriguez
(74) *Attorney, Agent, or Firm* — Robert P. Michal, Esq.; Carter, DeLuca & Farrell LLP

(57) ABSTRACT

A flotation arrangement for treating mineral ore particles suspended in slurry includes a primary flotation line with a rougher part and a scavenger part. Overflow of at least one rougher primary flotation cell is arranged to flow directly into a rougher cleaner cell. Underflow from a first rougher cleaner flotation cell is combined into overflow from a rougher primary flotation cell downstream from the rougher primary flotation cell from which the first rougher cleaner flotation cell receives primary overflow; or into combined overflows from rougher primary flotation cells downstream from the rougher primary flotation cell from which the first rougher cleaner flotation cell receives primary overflow; or into overflow from an additional rougher cleaner cell which receives primary overflow from at least one rougher primary flotation cell downstream from the rougher primary flotation
(Continued)

cell from which the first rougher cleaner flotation cell receives primary overflow.

44 Claims, 8 Drawing Sheets

(51) Int. Cl.
*B03D 1/24* (2006.01)
*C22B 1/00* (2006.01)
(52) U.S. Cl.
CPC .... *B03D 2203/02* (2013.01); *B03D 2203/025* (2013.01); *B03D 2203/04* (2013.01)
(58) Field of Classification Search
CPC ............ B03D 2203/04; B03D 2203/06; B03D 2203/08; B03D 2203/02; C22B 1/00
See application file for complete search history.

(56) References Cited

U.S. PATENT DOCUMENTS

| | | | | |
|---|---|---|---|---|
| 4,283,017 | A * | 8/1981 | Coale | B03B 9/00 209/164 |
| 4,460,459 | A * | 7/1984 | Shaw | B03D 1/002 209/167 |
| 4,877,517 | A * | 10/1989 | Bulatovic | B03D 1/016 209/167 |
| 4,960,509 | A | 10/1990 | McNeill | |
| 5,074,994 | A * | 12/1991 | Ray | B03D 1/002 209/167 |
| 5,285,972 | A | 2/1994 | Notebaart et al. | |
| 5,925,862 | A | 7/1999 | Morrisey, IV et al. | |
| 5,951,875 | A | 9/1999 | Kanel et al. | |
| 6,536,596 | B1 | 3/2003 | Niitti et al. | |
| 9,028,782 | B2 * | 5/2015 | Senior | B03D 1/002 209/166 |
| 9,346,062 | B2 * | 5/2016 | Gorain | B03D 1/085 |
| 9,475,067 | B2 * | 10/2016 | Bai | B03D 1/02 |
| 2014/0202932 | A1 * | 7/2014 | Xu | B03D 1/02 209/166 |
| 2019/0176166 | A1 * | 6/2019 | Rinne | G01F 1/661 |
| 2019/0388905 | A1 * | 12/2019 | Rinne | B03D 1/24 |
| 2020/0023380 | A1 * | 1/2020 | Bourke | C22B 1/00 |

FOREIGN PATENT DOCUMENTS

| | | |
|---|---|---|
| CN | 1820853 A | 8/2006 |
| CN | 203678523 U | 7/2014 |
| CN | 209663508 U | 11/2019 |
| CN | 209829277 U | 12/2019 |
| EP | 0476354 A2 | 3/1992 |
| GB | 538996 A | 8/1941 |
| WO | 9924169 A1 | 5/1999 |
| WO | 2015095054 A2 | 6/2015 |
| WO | 2015162340 A1 | 10/2015 |

OTHER PUBLICATIONS

International Search Report issued by the Finnish Patent and Registration Office acting as the International Searching Authority in relation to International Application No. PCT/FI2018/050107 dated Jun. 5, 2018 (5 pages).
Written Opinion of the International Searching Authority issued by the Finnish Patent and Registration Office acting as the International Searching Authority in relation to International Application No. PCT/FI2018/050107 dated Jun. 5, 2018 (8 pages).
Office Action issued by the Chilean Patent Office in relation to Chilean Application No. 201900409 dated Mar. 16, 2020 (3 pages).
Office Action issued by the Chilean Patent Office in relation to Chilean Application No. 201902266, dated May 15, 2020, 16 pages.
Office Action issued by the Chilean Patent Office in relation to Chilean Application No. 201902265, dated Jun. 15, 2020, 15 pages.
Extended European Search Report issued by the European Patent Office in relation to European Application No. 18753952.3 dated Nov. 25, 2020 (8 pages).
Extended European Search Report issued by the European Patent Office in relation to European Application No. 18753731.1 dated Nov. 25, 2020 (7 pages).
Chinese Office Action dated Nov. 25, 2020, issued in corresponding Chinese Appln. No. 201910114023.8, 7 pages.
Chinese Office Action dated Nov. 25, 2020, issued in related Chinese Appln. No. 201910114279.9, 6 pages.

* cited by examiner

FLOTATION ARRANGEMENT

CROSS-REFERENCE TO RELATED APPLICATIONS

This application is a continuation of PCT International Application No. PCT/FI2018/050107 filed Feb. 14, 2018, which claims priority to International Application No. PCT/FI2017/050094, filed Feb. 15, 2017, the disclosure of each of these applications are expressly incorporated herein by reference in their entirety.

TECHNICAL FIELD

The current disclosure relates to a flotation arrangement and its use, to a flotation plant, and to a flotation method for separating valuable metal containing ore particles from ore particles suspended in slurry.

SUMMARY OF THE INVENTION

A flotation arrangement is provided for treating mineral ore particles suspended in slurry. The flotation arrangement comprises flotation cells for the separation of slurry into underflow and overflow wherein the separation is performed with the help of flotation gas, and wherein the arrangement comprises a primary flotation line comprising a rougher part with at least two rougher primary flotation cells connected in series and arranged in fluid communication, overflow from at least one rougher primary flotation cell arranged to flow directly into a rougher cleaner cell arranged in fluid communication with the rougher primary flotation cell, and arranged to receive primary overflow from the rougher primary flotation cell for the recovery of a first concentrate. The primary flotation line further comprises a scavenger part with at least two scavenger primary flotation cells connected in series and arranged in fluid communication, overflow from the scavenger primary flotation cells arranged to flow back into a rougher flotation cell of the primary flotation line, or into a regrinding step and then into a scavenger cleaner flotation line. In the primary flotation line, a subsequent primary flotation cell is arranged to receive primary underflow from a previous primary flotation cell. The flotation arrangement is characterized in that underflow from a first rougher cleaner flotation cell is arranged to be combined into overflow from a rougher primary flotation cell downstream from the rougher primary flotation cell from which the first rougher cleaner flotation cell is arranged to receive primary overflow; or into combined overflows from rougher primary flotation cells downstream from the rougher primary flotation cell from which the first rougher cleaner flotation cell is arranged to receive primary overflow; or into overflow from an additional rougher cleaner cell arranged to receive primary overflow from at least one rougher primary flotation cell downstream from the rougher primary flotation cell from which the first rougher cleaner flotation cell is arranged to receive primary overflow.

The use of a flotation arrangement according to the present disclosure is intended to be employed in recovering mineral ore particles comprising a valuable mineral.

The flotation plant according to the invention comprises a flotation arrangement according to the present disclosure.

The flotation method for treating mineral ore particles suspended in slurry in flotation stages in which slurry is separated into underflow and overflow with the help of flotation gas, wherein slurry is subjected to primary flotation comprising at least two rougher flotation stages in series and in fluid communication, primary overflow from at least one rougher stage directed to a rougher cleaner flotation stage, for the recovery of a first concentrate, the at least one rougher flotation stage and the rougher cleaner flotation stage being in series and in fluid communication. The primary flotation further comprises at least two scavenger flotation stages in series and in fluid communication, primary overflow from the scavenger stages directed back to the first rougher stages, or into regrinding and then cleaner flotation. In the primary flotation, primary underflow from a previous primary flotation stage is directed to a subsequent primary flotation stage. The flotation method is characterized in that underflow from a first rougher cleaner flotation stage is combined into overflow from a rougher primary flotation stage downstream from the rougher primary stage from which the first rougher cleaner stage receives primary overflow; or into combined overflows from rougher primary flotation stages downstream from the rougher primary flotation stage from which the first rougher cleaner stage receives overflow; or into overflow from additional rougher cleaner stage receiving primary overflow from at least one rougher primary flotation stage downstream from the rougher primary flotation cell from which the first rougher cleaner flotation stage receives overflow.

With the invention described herein, the focus of treatment of slurry may be shifted on an efficient separation of valueless fraction from the ore particles and recovering a maximal amount of valuable particles. In other words, ore particles comprising very small or even minimal amounts of valuable material may be recovered for further processing/treatment. This may be especially beneficial for ores of poor quality, i.e. ores with very little valuable material initially, for example from poor mineral deposits which may have previously been considered economically too insignificant to justify utilization.

Basically, ore particles comprising relatively high amount of valuable mineral are treated only once in a primary flotation line, which may be understood as a treatment line comprising rougher and/or scavenger cells. Underflow from the primary flotation cells is directed downstream along the primary flotation line to ensure that as much of the valuable mineral material is recovered in the primary line. At the same time, overflow from at least one or some of the primary flotation cells is directed into a rougher cleaner flotation cell or a number of rougher cleaner flotation cells, which may be understood as a treatment line comprising cleaner cells, for the efficient separation of any non-desired particles from the material recovered from the primary line flotation cells. More specifically, overflow from the rougher primary cell or cells is directed to at least one rougher cleaner flotation cell for further treatment. By directing the secondary underflow 42a from a first rougher cleaner flotation cell downstream along the primary flotation line, or into overflow(s) from downstream rougher primary flotation cell(s); or into overflow from an additional rougher cleaner flotation cell; according to the invention, it may be further ensured that as much of the valuable mineral material is recovered. At the same time, flows of slurry having similar characteristics (for example ore particle size distribution, amount of valuable material comprised in the ore particles), may be effectively combined for concurrent treatment in order to make the overall process more efficient.

Further, when the underflow from a primary flotation cell or cells, or from a rougher cleaner flotation cell or cells, is forwarded downstream along the primary flotation line, or to overflow of a further/additional rougher cleaner flotation cell in the direction of the flow of slurry, or the primary overflow into the cleaner cells, by gravity, energy consumption can be curbed while still achieving very efficient recovery of valuable mineral.

It is possible to achieve a high grade for a part of the slurry stream, and at the same time, high recovery for the entire slurry stream passing through the flotation arrangement. Retreatment of the slurry flow in a number of adjoining flotation cells in this manner ensures effective recovery of mineral without any significant increase in energy consumption, as the flows of slurry need not be pumped in energy-consuming ways, but by utilizing the inherent hydraulic head of the downstream flows of slurry within the flotation arrangement and plant.

In the beginning or forward end of the flotation arrangement, it is thus possible to recover high grade of ore particle comprising valuable mineral, whereas in the end of the flotation arrangement may be utilized for recovering as much as possible of the ore particles comprising even a small amount of the valuable mineral. The grade of the overflow is increased by the utilization of the rougher cleaner flotation cells, while especially the primary flotation line ensures efficient overall recovery of ore particles comprising valuable mineral. The flotation arrangement enables increasing the grade without high-energy pumping, thus providing significant advantages over the state of the art.

The flotation arrangement, its use, the flotation plant, and the flotation method according to the invention has the technical effect of allowing the flexible recovery of various particle sizes, as well as efficient recovery of valuable mineral containing ore particles from poor ore raw material with relatively low amounts of valuable mineral initially. The advantages provided by the structure of the flotation line allow the accurate adjustment of the flotation line structural parameters according to the target valuable material at each installation.

By treating the slurry according to the present invention as defined by this disclosure, recovery of valuable material containing particles may be increased. The initial grade of recovered material may be lower, but the material (i.e. slurry) is also thus readily prepared for further processing, which may include for example regrinding and/or additional cleaning.

Arranging flotation lines so that at least some, or all flotation cells (i.e. the bottoms of the flotation cells) are on same level increases construction speed, simplifies planning and construction and thus reduces costs. This so-called uniplanarity of flotation cells or flotation lines might offer advantages through reduction of investment costs, as setting up a plant requires less ground work and less space. This might be especially advantageous when the flotation cell size is increased. This again, might be desirable from the perspective of optimizing process performance while reducing capital costs for the investment. In case the flotation cells are arranged in a uniplanar fashion, the flow of slurry from on flotation cell to the following flotation cell may be achieved by pumping action, for example by low-head pumps.

According to some embodiments of the invention, the flotation lines may also be arranged in a stepwise fashion, so that at least some of the flotation cells (i.e. the bottoms of the flotation cells), either in the primary flotation line or in the rougher cleaner flotation cells are positioned at different levels: for example, the bottom of a first primary flotation cell of a primary flotation line may be arranged higher than the bottom of the following further primary flotation cell(s) (rougher or scavenger primary flotation cell), and/or higher than the bottom of the first rougher cleaner flotation cell into which the overflow from the first primary flotation cell is directed. In that way, the slurry surface level of at least some of the flotation cells following the first primary flotation cells is lower, thus creating a step between any two subsequent flotation cells in direct fluid connection with each other. The thus-created step allows achieving a hydrostatic head or hydrostatic pressure differential (hydraulic gradient) between the two subsequent flotation cells, whereby the flow of slurry from one cell to the next may be realized by gravitational force, without any separate pumps. The hydraulic gradient forces the flow of slurry towards the tailings outlet or outlets of the flotation line. This may reduce the need for additional pumping. Further, pumping power requirement might be reduced as material flow is directed downstream gravitationally due to drop in slurry surface levels. This can apply even to embodiments in which the slurry surface levels of adjacent flotation cells in the flotation line are at one level. The decreased need of energy-intensive pumping will lead to savings in energy consumption, as well as simplified construction of the flotation operation, and to less need of space for the construction.

By directing the at least one first primary overflow directly to at least one stage of first rougher cleaner flotation for the recovery of a first concentrate is meant that the process comprises no grinding step in between the primary flotation stage and the rougher cleaner flotation stage. By eliminating the grinding step, the hydraulic head of slurry flow is not lost between any two subsequent stages, and gravity only may be used to drive the flow of slurry. The first primary overflow may thus be separated from the lower quality further primary overflow. The first primary overflow may be subjected to flotation separately from the further primary overflow, which increases the recovery of ore particles comprising valuable mineral.

Basically, flotation aims at recovering a concentrate of ore particles comprising a valuable mineral. By concentrate herein is meant the part of slurry recovered in overflow or underflow led out of a flotation cell. By valuable mineral is meant any mineral, metal or other material of commercial value.

Flotation involves phenomena related to the relative buoyancy of objects. The term flotation includes all flotation techniques. Flotation can be for example froth flotation, dissolved air flotation (DAF) or induced gas flotation. Froth flotation is a process for separating hydrophobic materials from hydrophilic materials by adding gas, for example air or nitrogen or any other suitable medium, to the process. Froth flotation could be made based on natural hydrophilic/hydrophobic difference or based on hydrophilic/hydrophobic differences made by addition of a surfactant or collector chemical. Gas can be added to the feedstock subject of flotation (slurry or pulp) by a number of different ways.

By a flotation arrangement herein is meant an assembly comprising a number, at least two, flotation units or flotation cells that are arranged in fluid connection with each other for allowing either gravity-driven or pumped slurry flow between flotation cells, to form a flotation line. The arrangement is meant for treating mineral ore particles suspended in slurry by flotation. Thus, valuable metal-containing ore particles are recovered from ore particles suspended in slurry. Slurry is fed through a feed inlet to the first flotation cell of the flotation line for initiating the flotation process. Flotation arrangement may be a part of a larger flotation plant containing one or more flotation arrangements. Therefore, a number of different pre-treatment and post-treatment devices or stages may be in operational connection with the components of the flotation arrangement, as is known to the person skilled in the art.

By flotation line herein is meant a part of the flotation arrangement where a number of flotation cells are arranged in fluid connection with each other so that the underflow of each preceding flotation cell is directed to the following or subsequent flotation cell as a infeed until the last flotation cell of the flotation line, from which the underflow is directed out of the line as tailings or reject flow. In connection with the method for flotation according to the present invention, by flotation herein is meant the entire flotation process taking place in a flotation line.

The flotation cells in a flotation arrangement are fluidly connected to each other. The fluid connection may be achieved by different lengths of conduits such as pipes or tubes, the length of the conduit depending on the overall physical construction of the flotation arrangement.

Alternatively, the flotation cells may be arranged in direct cell connection with each other. By direct cell connection herein is meant an arrangement, whereby the outer walls of any two subsequent flotation cells are connected to each other to allow an outlet of a first flotation cell to be connected to the inlet of the subsequent flotation cell without any separate conduit. A direct contact reduces the need for piping between two adjacent flotation cells. Thus, it reduces the need for components during construction of the flotation line, speeding up the process. Further, it might reduce sanding and simplify maintenance of the flotation line.

The fluid connection between flotation cells and flotation units may be direct, i.e. the two flotation cells (belonging to the same or different flotation lines) may be immediately adjacent to each other. Alternatively, the two flotation cells may be positioned at a distance from each other and connected through a pipe, channel or other means known in the art. The fluid connection between flotation cells may comprise various regulation mechanisms.

By "neighboring", "adjacent", or "adjoining" flotation cell herein is meant the flotation cell immediately following or preceding any one flotation cell, either downstream or upstream, or in a primary line, or in a line comprising rougher cleaner flotation cells, or the relationship between a flotation cell of a primary line and a rougher cleaner flotation cell into which the overflow from the flotation cell of the primary line is directed.

By a flotation cell is herein meant a tank or vessel in which a step of a flotation process is performed. A flotation cell is typically cylindrical in shape, the shape defined by an outer wall or outer walls. The flotation cells regularly have a circular cross-section. The flotation cells may have a polygonal, such as rectangular, square, triangular, hexagonal or pentagonal, or otherwise radially symmetrical cross-section, as well. The number of flotation cells may vary according to a specific flotation arrangement and/or operation for treating a specific type and/or grade of ore, as is known to a person skilled in the art. In connection with the method for flotation according to the present invention, by flotation stage herein is meant the flotation process taking place in one flotation cell.

The flotation cell may be a froth flotation cell, such as a mechanically agitated cell or tank cell, a column flotation cell, a Jameson cell, or a dual flotation cell. In a dual flotation cell, the cell comprises at least two separate vessels, a first mechanically agitated pressure vessel with a mixer and a flotation gas input, and a second vessel with a tailings output and an overflow froth discharge, arranged to receive the agitated slurry from the first vessel. The flotation cell may also be a fluidized bed flotation cell (such as a Hydro-Float™ cell), wherein air or other flotation gas bubbles which are dispersed by the fluidization system percolate through the hindered-setting zone and attach to the hydrophobic component altering its density and rendering it sufficiently buoyant to float and be recovered. In a fluidized bed flotation cell axial mixing is not needed. The flotation cell may also be of a type where a mechanical flotation cell (i.e. a flotation cell comprising a mechanical agitator or mixer) comprises a microbubble generator for generating microbubbles into the slurry within the flotation cell. The size distribution of microbubbles is smaller than that of the conventional flotation gas bubbles introduced by the mixer or by other gas introduction system which typically fall into a size range of 0.8-2 mm. The size range of microbubbles may be 1 µm-1.2 mm. Microbubbles may be introduced by a microbubble generator comprising a slurry recirculation system, or a direct sparger system.

The flotation cell may also be an overflow flotation cell operated with constant slurry overflow. In an overflow flotation cell, the slurry is treated by introducing flotation gas bubbles into the slurry and by creating a continuous upwards flow of slurry in the vertical direction of the first flotation cell. At least part of the valuable metal containing ore particles are adhered to the gas bubbles and rise upwards by buoyancy, at least part of the valuable metal containing ore particles are adhered to the gas bubbles and rise upwards with the continuous upwards flow of slurry, and at least part of the valuable metal containing ore particles rise upwards with the continuous upwards flow of slurry. The valuable metal containing ore particles are recovered by conducting the continuous upwards flow of slurry out of the at least one overflow flotation cell as slurry overflow. As the overflow cell is operated with virtually no froth depth or froth layer, effectively no froth zone is formed on the surface of the pulp at the top part of the flotation cell. The froth may be non-continuous over the cell. The outcome of this is that more valuable mineral containing ore particles may be entrained into the concentrate stream, and the overall recovery of valuable material may be increased.

All of the flotation cells of a flotation arrangement according to the invention may be of a single type, that is, rougher flotation cells in the rougher part, scavenger flotation cells in the scavenger part, and rougher cleaner flotation cells may be of one single flotation cell type so that the flotation arrangement comprises only one type of flotation cells as listed above. Alternatively, a number of flotation cells may be of one type while other cells are of one or more type so that the flotation arrangement comprises two or more types of flotation cells as listed above.

Depending on its type, the flotation cell may comprise a mixer for agitating the slurry to keep it in suspension. By a mixer is herein meant any suitable means for agitating slurry within the flotation cell. The mixer may be a mechanical agitator. The mechanical agitator may comprise a rotor-stator with a motor and a drive shaft, the rotor-stator construction arranged at the bottom part of the flotation cell. The cell may have auxiliary agitators arranged higher up in the vertical direction of the cell, to ensure a sufficiently strong and continuous upwards flow of the slurry.

By overflow herein is meant the part of the slurry collected into the launder of the flotation cell and thus leaving the flotation cell. Overflow may comprise froth, froth and slurry, or in certain cases, only or for the largest part slurry. In some embodiments, overflow may be an accept flow containing the valuable material particles collected from the slurry. In other embodiments, the overflow may be a reject flow. This is the case in when the flotation arrangement, plant and/or method is utilized in reverse flotation.

By underflow herein is meant the fraction or part of the slurry which is not floated into the surface of the slurry in the flotation process. In some embodiments the underflow may be a reject flow leaving a flotation cell via an outlet which typically is arranged in the lower part of the flotation cell. Eventually the underflow from the final flotation cell of a flotation line or a flotation arrangement may leave the entire arrangement as a tailings flow or final residue of a flotation plant. In some embodiments, the underflow may be an accept flow containing the valuable mineral particles. This is the case in when the flotation arrangement, plant and/or method is utilized in reverse flotation.

By reverse flotation herein is meant an inverse flotation process typically utilized in the recovery of iron. In that case, the flotation process is directed for collecting the non-valuable part of the slurry flow into the overflow. The overflow in reverse flotation process for iron contains typically silicates, while the valuable iron-containing mineral particles are collected in the underflow. Reverse flotation may also be used for industrial minerals, i.e. geological mineral mined for their commercial values which are not fuel, nor sources of metals, such as bentonite, silica, gypsum, and talc.

By downstream herein is meant the direction concurrent with the flow of slurry (forward current, denoted in the figures with arrows), and by upstream herein is meant the direction countercurrent with or against the flow of slurry.

By concentration herein is meant the floated part or fraction of slurry of ore particles comprising a valuable mineral. A first concentration may comprise ore particles comprising one valuable mineral, where as a second concentration may comprise ore particles comprising another valuable mineral. Alternatively, the distinctive definitions first, second etc., may refer to two (or more) concentrations of ore particles comprising the same valuable mineral but two (or more) distinctly different particle size distributions.

By a rougher flotation, rougher part of the flotation line, rougher stage and/or rougher cells herein is meant a flotation stage that produces a rougher concentrate. The objective is to remove a maximum amount of the valuable mineral at as coarse a particle size as practical. Complete liberation is not required for rougher flotation, only sufficient liberation to release enough gangue from the valuable mineral to get a high recovery. The primary objective of a rougher stage is to recover as much of the valuable minerals as possible, with less emphasis on the quality of the concentrate produced.

The rougher concentrate is normally subjected to further stages of cleaner flotation in a rougher cleaner flotation cell or line to reject more of the undesirable minerals that have also reported to the froth, in a process known as cleaning. The product of cleaning is known as cleaner concentrate or final concentrate.

Rougher flotation is often followed by scavenger flotation that is applied to the rougher tailings. By a scavenger flotation, a scavenger part of the flotation line, scavenger stage and/or a scavenger cell is meant a flotation stage wherein the objective is to recover any of the valuable mineral material that was not recovered during the initial rougher stage. This might be achieved by changing the flotation conditions to make them more rigorous than the initial roughing, or, in some embodiments of the invention, by the introduction of microbubble into the slurry. The concentrate from a scavenger cell or stage could be returned to the rougher feed for re-floating or directed to a regrinding step and thereafter to a scavenger cleaner flotation line.

By cleaner flotation, a rougher/scavenger cleaner line, cleaner/cleaning stage and/or a cleaner cell is meant a flotation stage wherein the objective of cleaning is to produce as high a concentrate grade as possible.

By pre-treatment and/or post-treatment and/or further processing is meant for example comminution, grinding, separation, screening, classification, fractioning, conditioning or cleaning, all of which are conventional processes as known to a person skilled in the art. A further processing may include also at least one of the following: a further cleaner flotation cell, which may be a conventional cleaner flotation cell, a recovery cell, a rougher cell, or a scavenger cell.

By slurry surface level herein is meant the height of the slurry surface within the flotation cell as measured from the bottom of the flotation cell to the launder lip of the flotation cell. In effect, the height of the slurry is equal to the height of a launder lip of a flotation cell as measured from the bottom of the flotation cell to the launder lip of the flotation cell. For example, any two subsequent flotation cells may be arranged in a stepwise fashion in a flotation line so that the slurry surface level of such flotation cells is different (i.e. the slurry surface level of the first of such flotation cells is higher than the slurry surface level of the second of such flotation cells). This difference in the slurry surface levels is defined herein as "step" between any two subsequent flotation cells. The step or the difference in slurry surface levels is a difference allowing the flow of slurry be driven by gravity or gravitation force, by creating a hydraulic head between the two subsequent flotation cells.

In an embodiment of the flotation arrangement, primary overflow of at least one further rougher primary flotation cell is arranged to flow into a second rougher cleaner cell arranged in fluid communication with the further rougher primary flotation cell, and arranged to receive primary overflow from the further rougher primary flotation cell for the recovery of a second concentrate.

In a further embodiment of the flotation arrangement, underflow from the second rougher cleaner flotation cell is arranged to be combined into overflow from a rougher primary flotation cell downstream from the further rougher primary flotation cell from which the second rougher cleaner flotation cell is arranged to receive primary overflow; or into combined overflows from rougher primary flotation cells downstream from the further rougher primary flotation cell from which the second rougher cleaner cell is arranged to receive primary overflow; or into overflow from the additional rougher cleaner cell arranged to receive primary overflow from one or more rougher primary flotation cells downstream from the further rougher primary flotation cell from which the second rougher cleaner flotation cell is arranged to receive primary overflow.

By combining flows of slurry with substantially the same characteristics (ore particle size distribution, amount of valuable material comprised by the ore particles, for example), the overall efficiency of the flotation process within the flotation arrangement may be improved without essentially increasing the energy consumption or the space required by the flotation arrangement. At the same time as initially good-quality slurry is treated only once in the primary flotation line, i.e. any costly and unnecessary over-treatment may be avoided, it may be ensured that any ore particles comprising valuable mineral that may have for various reasons ended up in underflow, becomes collected into the concentrate, thus improving the efficiency as well.

In an embodiment of the invention, the additional rougher cleaner cell is arranged to receive primary overflow from at least one further rougher primary flotation cell from which primary overflow is not arranged to flow into the first or the second rougher cleaner flotation cell.

In an embodiment of the flotation arrangement, the first rougher cleaner flotation cell is arranged to receive primary overflow from the first rougher primary flotation cell, and the additional rougher cleaner flotation cell is arranged to receive primary overflow from at least two further rougher primary flotation cells.

The additional rougher cleaner flotation cell may act as a recovery cell. In effect, this kind of arrangement may prevent ore particles comprising valuable mineral from ending up in the tailings flow, thereby further ensuring good recovery of the desired concentrate.

By utilizing an additional rougher cleaner flotation cell it may be ensured that all available valuable mineral becomes recovered from the flow of slurry of the primary line into the overflow or concentrate. The loss of ore particles comprising valuable mineral may be minimized, further improving the recovery efficiency of froth the flotation arrangement and plant. Similarly, when using the flotation arrangement in reverse flotation, in the underflow from the primary line, as much of the ore particles comprising valuable material as possible may be recovered. The underflow from the additional rougher cleaner flotation cell may be directed to regrinding circuit or step for ensuring recovery of ore particles comprising valuable mineral from that flow of slurry, as well.

Further, the need for pumping may be reduced at the same time as the underflow of one or more rougher cleaner flotation cells becomes efficiently re-treated. Following this operation with an additional rougher cleaner flotation cell acting as a recovery cell, a significant part of the ore particles comprising valuable mineral may be effectively floated. From the primary line, at a location where the high grade concentrate has already been taken out, a sufficient amount of primary overflow may still be collected for efficiently floating the desired concentrate away. In addition, the underflow from the additional rougher cleaner flotation cell may be directed into a further processing step. The underflow may be especially suitable for a further grinding step.

By additional rougher cleaner flotation cell herein is meant a flotation cell from which the overflow is directed out of the flotation arrangement, for example directly to further processing step such as a grinding step or a frother step. The underflow of the additional rougher flotation cell may be directed back upstream, into the first rougher primary flotation cell of a primary flotation line, or to a rougher primary flotation cell upstream from the rougher primary flotation cell from which the overflow into the additional rougher cleaner flotation cell was received; or out of the flotation arrangement, either as tailings flow directed into further treatment outside the flotation arrangement, for example regrinding, or as an infeed into another flotation arrangement for the recovery of a further concentrate.

In an embodiment of the flotation arrangement, the rougher cleaner flotation cells are arranged in direct fluid communication with the rougher primary flotation cell or cells from which they are arranged to receive primary overflow By direct fluid communication herein is meant that any two neighboring or adjacent or adjoining flotation cells are so connected that there are no additional process steps such as grinding arranged in between any two flotation cells or flotation stages. This is not to be mixed up with the definition of direct cell connection as described earlier above.

In certain cases of conventional froth flotation process, the overflow of a first flotation cell may be directed initially to a re-grinding step, or to other further processing step before it is directed into a cleaner flotation cell. This is especially typical for conventional flotation operation comprising a rougher or a scavenger stage followed by a cleaner stage.

In the flotation arrangement, plant and method according to the present invention, such further processing step may be forgone, and the rougher primary flotation cell from which primary overflow is directed into a rougher cleaner flotation cell and that rougher cleaner flotation cell may thus be in direct fluid connection with each other. There may be a similar direct fluid communication arranged between any other two flotation cells of the flotation arrangement, as well. However, it is equally conceivable that underflows or some of the underflows from the rougher cleaner cell or cells may be subjected to a re-grinding step prior to feeding the flow further in the flotation arrangement, in order to liberate valuable mineral comprising particles efficiently. For example, underflow from a first rougher cleaner flotation cell may be reground before it is led into the combined overflows from further rougher primary flotation cells, to be treated in the additional rougher cleaner flotation cell. It is also conceivable that the combined flow of slurry comprising underflow from one or more rougher cleaner flotation cells and overflow from one or more rougher primary flotation cells may be first subjected to a re-grinding step, and only after that led into an additional rougher cleaner flotation cell as infeed, to be treated.

In an embodiment of the flotation arrangement, the primary flotation line comprises at least four primary flotation cells, or 4-10 flotation cells, or 4-7 flotation cells.

In an embodiment of the flotation arrangement, the rougher part of the primary flotation line comprises at least two rougher primary flotation cells, or 2-6 rougher primary flotation cells, or 2-4 rougher primary flotation cells.

In an embodiment of the flotation arrangement, the scavenger part of the primary flotation line comprises at least two scavenger primary flotation cells, or 2-6 scavenger primary flotation cells, or 2-4 scavenger primary flotation cells.

Having a sufficient number of primary flotation cells (rougher and/or scavenger primary flotation cells) allows the production of high grade for part of the concentrate, and at the same time, ensuring high recovery of the desired valuable mineral throughout the primary line, thus avoiding having any of the valuable mineral ending up in the tailings flow. As much as possible of the ore particles comprising valuable mineral may be floated while still minimizing the required pumping energy to achieve this.

In an embodiment of the flotation arrangement, a rougher cleaner flotation cell is arranged to receive primary overflow from 1-3 rougher primary flotation cells, or from 1-2 rougher primary flotation cells.

In an embodiment of the flotation arrangement, a rougher cleaner flotation cell is arranged to receive primary overflow from at most two rougher primary flotation cells.

In an embodiment of the flotation arrangement, a rougher cleaner flotation cell is arranged to receive primary overflow from one rougher primary flotation cell.

In an embodiment of the flotation arrangement, a second rougher cleaner flotation cell is arranged to receive primary overflow from at least two rougher primary flotation cells.

Even a single rougher cleaner flotation cell may be sufficient for cleaning the overflow from a number of primary flotation cells to a reasonable level, i.e. increasing the grade of the concentrate recovered from the primary line.

Underflow even from a rougher cleaner flotation cells may have high enough volume to be sent to further treatment in the primary line to further increase the recovery.

In this way, the overflows of different rougher primary flotation cells are not mixed to a very high degree. Each overflow may then be treated in the best possible way to ensure sufficient treatment, and only a small number of rougher cleaner flotation cells acting as recovery cells are needed to achieve a high grade concentrate.

In an embodiment of the flotation arrangement, a first rougher cleaner flotation cell has a larger volume than a second rougher cleaner flotation cell.

The first rougher primary flotation cell may have a concentrate of a higher grade in its overflow than the later rougher primary flotation cells in the primary flotation line. The overflows from those later primary flotation cells may then be treated in smaller rougher cleaner flotation cells, having thus a shorter flotation time. This kind of arrangement may ensure a concentrate of a higher grade also from the further rougher cleaner flotation cells.

In an embodiment of the flotation arrangement, a second rougher cleaner flotation cell has a larger volume than a first rougher cleaner flotation cell.

The overflow from a rougher primary cell or cells going to the first rougher cleaner flotation cell may have higher quality (i.e. higher grade) than the overflow from the rougher primary flotation cells located further downstream in the rougher primary flotation line, going to a second rougher cleaner flotation cell. The second rougher cleaner flotation cell may thus need more capacity for treating the slurry efficiently. Further, having excessive treatment in a first rougher cleaner flotation cell may lead to increased pumping requirements, which would lead to undesired increased energy consumption. The effect of this kind of embodiment is that while engaging in minimum pumping to drive the flows of slurry, at least a part of the concentrate may be recovered with very high grade.

In an embodiment of the flotation arrangement, the first rougher primary flotation cell is at least 150 $m^3$ in volume, or at least 500 $m^3$ in volume, or at least 2000 $m^3$ in volume.

In an embodiment of the flotation arrangement, the second rougher primary flotation cell is at least 100 $m^3$ in volume, or at least 300 $m^3$, or at least 500 $m^3$ in volume.

Utilizing flotation cells with a volumetric size of at least 400 $m^3$ increases the probability of collisions between gas bubbles created into the flotation cells for example by means of a rotor, and the particles comprising valuable mineral, thus improving the recovery rate for the valuable mineral, as well as the overall efficiency of the flotation arrangement. Larger flotation cells have a higher selectivity as more collisions between the gas bubbles and the ore particles may take place due to the longer time the slurry stays in the flotation cell. Therefore most of the ore particles comprising valuable mineral may be floated. In addition, the backdrop of buoyant ore particles may be higher, which means that ore particles comprising very low amount of valuable mineral drop back into the bottom of the flotation cell. Thus the grade of overflow and/or concentrate from larger flotation cells may be higher. These kinds of rougher primary flotation cells may ensure high grade.

In an embodiment of the flotation arrangement, the second rougher primary flotation cell is equal in volume as the first rougher primary flotation cell, or smaller in volume than the first rougher primary flotation cell.

In an embodiment of the flotation arrangement, a first rougher cleaner flotation cell is 100-2000 $m^3$ in volume, preferably 400-1000 $m^3$ in volume.

Utilizing flotation cells with a volumetric size of at least 400 $m^3$ increases the probability of collisions between gas bubbles created into the flotation cells for example by means of a rotor, and the particles comprising valuable mineral, thus improving the recovery rate for the valuable mineral, as well as the overall efficiency of the flotation arrangement. As mentioned above, larger flotation cells have a higher selectivity as more collisions between the gas bubbles and the ore particles may take place due to the longer time the slurry stays in the flotation cell. Therefore most of the ore particles comprising valuable mineral may be floated. In addition, the backdrop of buoyant ore particles may be higher, which means that ore particles comprising very low amount of valuable mineral drop back into the bottom of the flotation cell. Thus the grade of overflow and/or concentrate from larger flotation cells may be higher.

In an embodiment of the flotation arrangement, a second rougher cleaner flotation cell is 100-2000 $m^3$ in volume, preferably 300-1000 $m^3$ in volume.

Utilizing flotation cells with a volumetric size of at least 300 $m^3$ increases the probability of collisions between gas bubbles created into the flotation cells for example by means of a rotor, and the particles comprising valuable mineral, thus improving the recovery rate for the valuable mineral, as well as the overall efficiency of the flotation arrangement.

In case the first rougher primary flotation cells have a relatively large volume, there may be no need for large subsequent flotation cells, but rather, the flotation cells (rougher primary cells or rougher cleaner cells) downstream from the first rougher primary cell or cells may be smaller and therefore more efficient. In flotation processes of certain minerals, it may be easy to float a significant part of the ore particles comprising valuable mineral with high grade. In that case it may be possible to have flotation cells of smaller volume downstream and still achieve high recovery rate.

In an embodiment of the flotation arrangement, the volume of a first rougher cleaner flotation cell is 2-50% of the aggregate volume of the at least one rougher primary flotation cell, preferably 3-30% of the aggregate volume of the at least one rougher primary flotation cell from which it is arranged to receive primary overflow.

In an embodiment of the flotation arrangement, the volume of a second rougher cleaner flotation cell is 2-50% of the aggregate volume of the at least one rougher primary flotation cell, preferably 3-30% of the aggregate volume of the at least one rougher primary flotation cell from which it is arranged to receive primary overflow.

By aggregate volume herein is meant the combined volume of the rougher primary flotation cells from which a rougher cleaner flotation cell receives primary overflow. For example, the second rougher cleaner flotation cell may receive primary overflows from more than one rougher primary flotation cell of the primary flotation line. In that case, the aggregate volume is the combined volume of the rougher primary flotation cells.

In such embodiments, a part of the concentrate is produced with high grade. When the rougher cleaner flotation cells are smaller, the residence time of ore particles within the flotation cell is lower, i.e. there is less time to float the desired concentrate. The thus achieved concentrate has therefore a higher grade.

Constructing the rougher cleaner flotation cell or cells in the direction of the slurry flow smaller than the rougher flotation cell or cells in the primary flotation line might provide efficiency benefits. The effect might be especially pronounced if the rougher cleaner flotation cell or cells are at least 10% smaller than the rougher primary flotation cells in the primary flotation line. For example, it is possible that the at least one rougher cleaner flotation cell is at least 20 or 30% smaller than the at least one rougher primary flotation cell of the primary flotation line.

In an embodiment of the flotation arrangement, the flow of slurry between any two flotation cells in fluid connection is driven by gravity.

In a further embodiment of the flotation arrangement, the flow of slurry between the first rougher primary flotation cell and the second rougher primary flotation cell is driven by gravity.

In an embodiment of the flotation arrangement, flow of slurry between a rougher primary flotation cell and a rougher cleaner flotation cell in fluid connection with the rougher primary flotation cell is driven by gravity.

In a further embodiment of the flotation arrangement, flow of slurry between the first rougher primary flotation cell and a first rougher cleaner flotation cell is driven by gravity.

In yet another embodiment of the flotation arrangement, flow of slurry between the second rougher primary flotation cell and a second rougher cleaner flotation cell is driven by gravity.

By arranging the flow of slurry be driven by gravity, savings in energy consumption may be achieved as no additional pumping is required to drive the slurry downstream.

By avoiding energy-intensive pumping in flotation arrangement, significant savings in energy may be achieved, while, at the same time, ensuring efficient recovery of valuable mineral material from ores of poor quality, i.e. comprising even very little valuable mineral to start with. It may be possible to produce some part of the concentration with high grade, but also, at the same time have a good overall recovery of the desired valuable mineral. Only insignificant amounts of the valuable mineral may end up in the tailing flow.

The invention at hand aims at improving the mineral recovery process while decreasing energy consumption of the process. This is made possible by utilizing the inherent flows of slurry of the process, i.e. by moving the slurry flow into retreatment in downstream flotation cells. By arranging the flotation process thus, it is possible to direct the flow of slurry by gravity. In some embodiments, the flow of slurry may also be directed by low-intensity pumping, or by a suitable combination of the two, that is, gravity and low-intensity pumping.

By low-head pump herein is meant any type of pump producing a low pressure for driving a flow of slurry downstream. Typically, a low-head pump produces a maximum head of up to 1.0 meters, i.e. may be used to drive the flow of slurry between two adjoining flotation cells with less than 30 cm difference in slurry surface level. A low-head pump may typically have an impeller for creating an axial flow.

In an embodiment of the flotation arrangement, primary overflow from at least one scavenger primary flotation cell is arranged to flow directly into a regrinding step.

In a further embodiment of the flotation arrangement, the combined primary overflow from the scavenger flotation cells is arranged to flow directly into a regrinding step.

In an embodiment of the flotation arrangement, the combined overflows of rougher cleaner flotation cells is arranged to flow into a further processing step.

In an embodiment of the flotation arrangement, underflow from the last scavenger primary flotation cell is arranged to flow into a further processing step, or to leave the flotation arrangement as tailings.

In a further embodiment of the flotation arrangement, the further processing step comprises at least one step selected from: a grinding step, a conditioning step, a flotation step.

By further processing herein is meant any suitable process step such as a grinding step or a chemical addition step, or any other process step typically utilized in connection with a flotation arrangement, and known to a person skilled in the art. The grinding step may comprise at least one grinding mill, which may be any suitable grinding mill as is known by a person skilled in the art.

In an embodiment of the flotation arrangement, the flotation arrangement comprises two primary flotation lines, and a first rougher cleaner flotation cell is arranged to receive overflow from the first rougher primary flotation cells of both primary flotation lines.

In such arrangements, it may be possible to have a higher volume of slurry inflow into a rougher cleaner flotation cell. Therefore it may be feasible to utilize flotation cells of larger volume also in the rougher cleaner cells, benefits of which, mostly relating to efficiency, have already been discussed earlier in this disclosure.

In an embodiment of the flotation arrangement, the flotation cells comprise a froth flotation cell.

In an embodiment of the flotation arrangement, a third rougher primary flotation cell, and any subsequent rougher primary flotation cell after the third rougher primary flotation cell, comprise a froth flotation cell.

In a further embodiment of the flotation arrangement, the first rougher primary flotation cell and a second rougher primary flotation cell are operated as overflow flotation cells.

In a further embodiment of the flotation arrangement, flotation gas is fed into the flotation cell where slurry is separated into overflow and underflow.

In a further embodiment of the flotation arrangement, the flotation cell into which flotation gas is fed comprises a mixer.

In a further embodiment of the flotation arrangement, flotation gas is fed into a preparation flotation cell into which a mixer is arranged.

By preparation flotation cell herein is meant a flotation vessel in which the slurry may be prepared for floating, typically by introducing flotation gas and by employing mechanical agitation, prior to the slurry being led into a second vessel where the actual flotation process takes place. The preparation flotation cell may, for example, be the first vessel of a dual flotation cell described earlier in this disclosure.

In an embodiment of the flotation arrangement, the mineral ore particles comprise Cu, or Zn, or Fe, or pyrite, or metal sulfide, such as gold sulfide. Mineral ore particles comprising other valuable mineral such as Pb, Pt, PGMs (platinum group metals Ru, Rh, Pd, Os, Ir, Pt), oxide mineral, industrial minerals such as Li (i.e. spodumene), petalite, and rare earth minerals may also be recovered, according to the different aspects of the present invention.

An embodiment of the use of a flotation arrangement according to the invention is particularly intended for recovering mineral ore particles comprising a valuable mineral from low grade ore.

An embodiment of the use of a flotation arrangement according to the invention is intended for recovering mineral ore particles comprising Cu from low grade ore.

An embodiment of the use of a flotation arrangement according to the invention is intended for a flotation arrangement wherein the first rougher primary flotation cell is at least 150 m³ in volume, or at least 500 m³ in volume, or at least 2000 m³ in volume, and wherein the flow of slurry is driven by gravity.

An embodiment of the use of a flotation arrangement according to the invention is intended for a flotation arrangement wherein the second rougher primary flotation cell is at least 100 m³ in volume, or at least 300 m³ in volume, or at least 500 m³ in volume, and wherein the flow of slurry is driven by gravity.

An embodiment of the use of a flotation arrangement according to the invention is intended for a flotation arrangement wherein flow of slurry between the primary flotation cells is driven by gravity.

An embodiment of the use of a flotation arrangement according to the invention is intended for a flotation arrangement wherein flow of slurry between a rougher primary flotation cell and a rougher cleaner flotation cell in fluid connection with the rougher primary flotation cell is driven by gravity.

An embodiment of the use of a flotation arrangement according to the invention is intended for a flotation arrangement wherein the first rougher primary flotation cell and a first rougher cleaner flotation cell is driven by gravity.

An embodiment of the use of a flotation arrangement according to the invention is intended for a flotation arrangement wherein flow of slurry between the second rougher primary flotation cell and a second rougher cleaner flotation cell is driven by gravity.

An embodiment of the use of a flotation arrangement according to the invention is intended for recovering mineral ore particles comprising Fe by reverse flotation.

In an embodiment of the flotation plant, the plant comprises at least two, or at least three flotation arrangements according to the invention.

In an embodiment of the flotation plant, the plant comprises at least one first flotation arrangement for the recovery of a first concentrate and at least one second flotation arrangement for the recovery of a second concentrate.

In an embodiment of the flotation plant, the primary flotation cells of the primary line of the at least one first flotation arrangement for the recovery of the first concentrate and the primary flotation cells of the primary line of the at least one second flotation arrangement for the recovery of the second concentrate are arranged in series.

In an embodiment of the flotation plant, the plant further comprises an arrangement for further treating mineral ore particles suspended in slurry so that the second concentrate differs from the first concentrate.

In an embodiment of the flotation plant, the arrangement for further treating mineral ore particles suspended in slurry comprises a grinding step, disposed between a first flotation arrangement and a second flotation arrangement.

In this case, the second concentrate recovered from the second flotation arrangement may have a similar mineralogy as the first concentrate recovered from the first flotation arrangement, but the particle size distribution of the slurry being led into the second flotation arrangement after the grinding step may be different.

In an embodiment of the flotation plant, the plant for further treating mineral ore particles suspended in slurry comprises an arrangement for the addition of flotation chemicals, disposed between a first flotation arrangement and a second flotation arrangement.

In this case, the second concentrate recovered from the second flotation arrangement may have a different mineralogy from the first concentrate recovered from the first flotation arrangement, the use of flotation chemicals utilized determined naturally by the desired valuable mineral intended to be recovered by the second flotation arrangement.

In an embodiment of the flotation plant, a flotation arrangement is arranged to recover mineral ore particles comprising Cu, and/or Zn, and/or pyrite, and/or a metal from a sulfide, such as gold.

In an embodiment of the flotation plant, the flotation arrangement is arranged to recover mineral ore particles comprising Cu from low grade ore.

For example, in recovering copper from low grade ores obtained from poor deposits of mineral ore, the copper amounts may be as low as 0.1% by weight of the feed, i.e. infeed of slurry into the flotation arrangement. The flotation arrangement according to the invention may be very practical for recovering copper, as copper is a so-called easily floatable mineral. In the liberation of ore particles comprising copper, it may be possible to get a relatively high grade from the first primary flotation cells without any extra pumping between the flotation cells.

By using the flotation arrangement according to the present invention, the recovery of such low amounts of valuable mineral, for example copper, may be efficiently increased, and even poor deposits cost-effectively utilized. As the known rich deposits have increasingly already been used, there is a tangible need for processing the less favorable deposits as well, which previously may have been left unmined due to lack of suitable technology and processes for recovery of the valuable material in very low amounts in the ore.

In a further embodiment of the flotation plant, a flotation arrangement is arranged to recover Fe by reverse flotation.

In reverse flotation, mineral ore particles comprising undesirable material are removed from the slurry by arranging the gas bubbles to adhere to those particles and removing them from the flotation cell in the overflow, whereas the valuable mineral material comprising ore particles are recovered in the underflow, thus inversing the conventional flotation flows of accept into overflow and reject into underflow. Typically in reverse flotation of Fe, the large mass pull of invaluable material, most commonly silicates, may cause significant problems in controlling the flotation process. Inevitably, some of the mineral ore particles comprising valuable Fe end up into the overflow (especially fine, light particles). By directing this overflow into a rougher cleaner flotation cell for retreatment, at least some of the mineral ore particles comprising Fe can be processed into the underflow of a rougher cleaner flotation cell and thus recovered.

Similarly, treatment of slurries for the recovery of such industrial minerals as bentonite, silica, gypsum, or talc, may be improved by using reverse flotation in the same manner as for Fe. In recovering industrial minerals, the goal of flotation may be, for example, the removal of dark particles into the overflow reject, and recovery of white particles into the underflow accept. In that kind of process, some of the lighter, finer white particles may end up into the overflow. Those particles could be efficiently recovered by the invention according to the present disclosure.

In an embodiment of the flotation method according to the invention, primary overflow from at least one further rougher primary flotation stage is directed into a second rougher cleaner stage, the at least one further rougher flotation stage and the second rougher cleaner flotation stage being in series and in fluid communication.

In an embodiment of the flotation method, underflow from the second rougher cleaner flotation stage is combined into overflow from a rougher primary flotation stage downstream from the further rougher primary stage from which the second rougher cleaner stage receives primary overflow; or combined overflows from rougher primary flotation stages downstream from the further rougher primary flotation stage from which the second rougher cleaner stage receives overflow; or overflow from additional rougher cleaner stage receiving primary overflow from at least one rougher primary flotation stage downstream from the further rougher primary flotation cell from which the second rougher cleaner flotation stage receives overflow.

In an embodiment of the flotation method, the additional rougher cleaner flotation stage receives primary overflow from at least one further rougher primary flotation stage from which primary overflow is not received by the first or the second rougher cleaner flotation stage.

In an embodiment of the flotation method, primary overflow from a first rougher flotation stage is directed to a first rougher cleaner flotation stage, and primary overflow from at least two further rougher flotation stages is directed to the additional rougher cleaner flotation stage.

In an embodiment of the flotation method, slurry is subjected to at least three primary flotation stages, or to 3-10 primary flotation stages, or to 4-7 primary flotation stages.

In an embodiment of the flotation method, primary overflow from 1-3 rougher flotation stages, or from 1-2 rougher flotation stages is directed to a rougher cleaner flotation stage.

In an embodiment of the flotation method, froth flotation is employed in at least one primary flotation stage and/or at least one rougher cleaner flotation stage.

In an embodiment of the flotation method, overflow flotation is employed in the first rougher flotation stage, or in the first rougher flotation stage and in a second rougher flotation stage.

BRIEF DESCRIPTION OF THE DRAWINGS

The accompanying drawings, which are included to provide a further understanding of the current disclosure and which constitute a part of this specification, illustrate embodiments of the disclosure and together with the description help to explain the principles of the current disclosure. In the drawings.

DETAILED DESCRIPTION

Reference will now be made in detail to the embodiments of the present disclosure, an example of which is illustrated in the accompanying drawing.

The description below discloses some embodiments in such a detail that a person skilled in the art is able to utilize the arrangement, plant and method based on the disclosure. Not all steps of the embodiments are discussed in detail, as many of the steps will be obvious for the person skilled in the art based on this disclosure.

For reasons of simplicity, item numbers will be maintained in the following exemplary embodiments in the case of repeating components.

Figure 5:
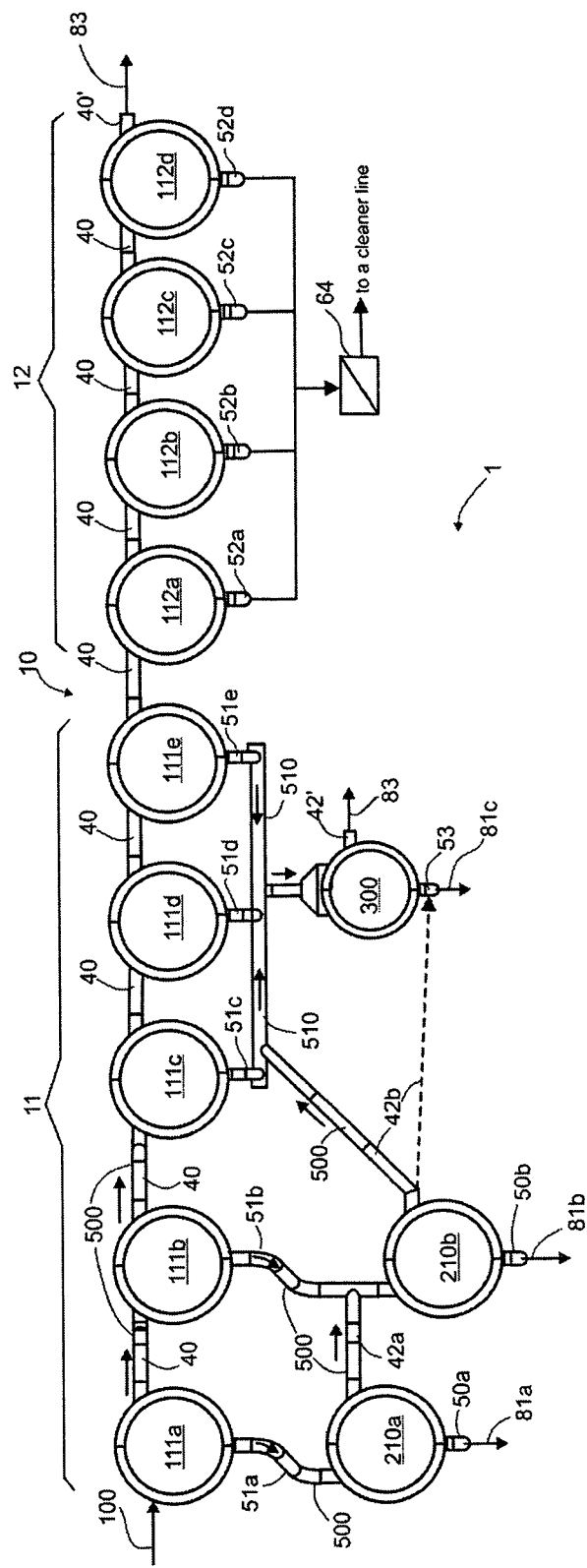
FIG. 5 is a flow chart illustration for an embodiment of the invention.
Figure 6:
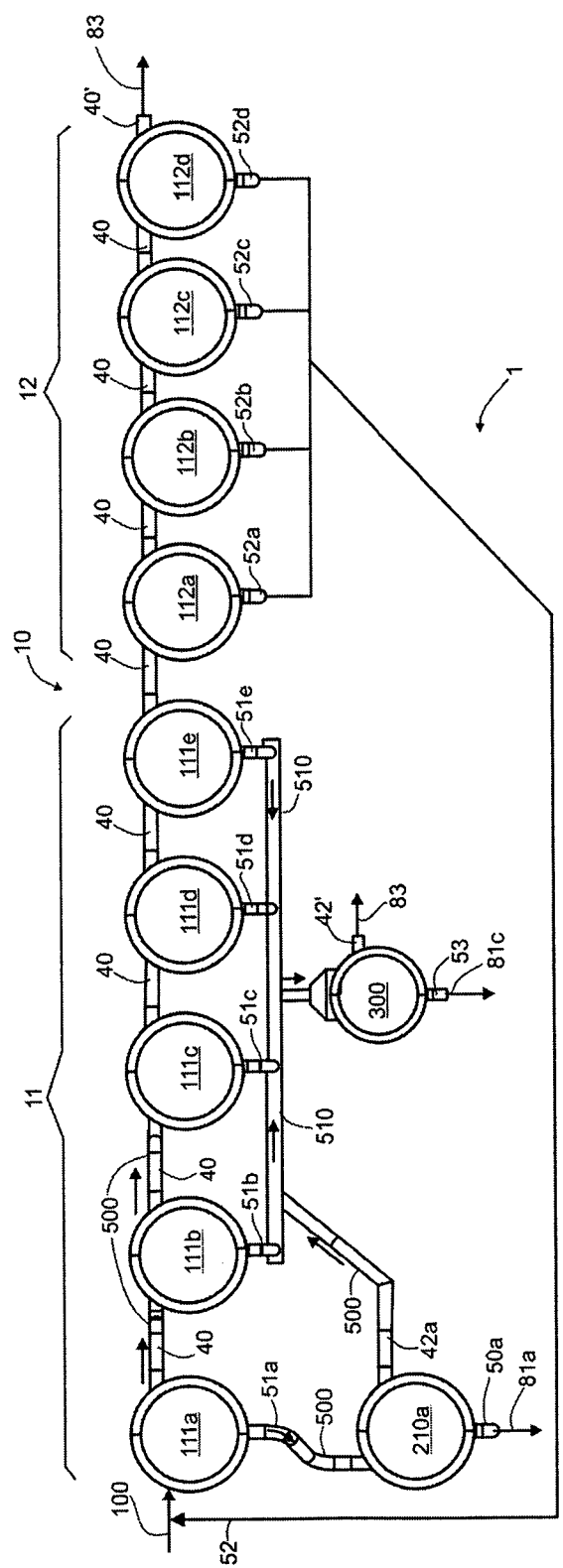
FIG. 6 is a flow chart illustration for an embodiment of the invention.
Figure 7:
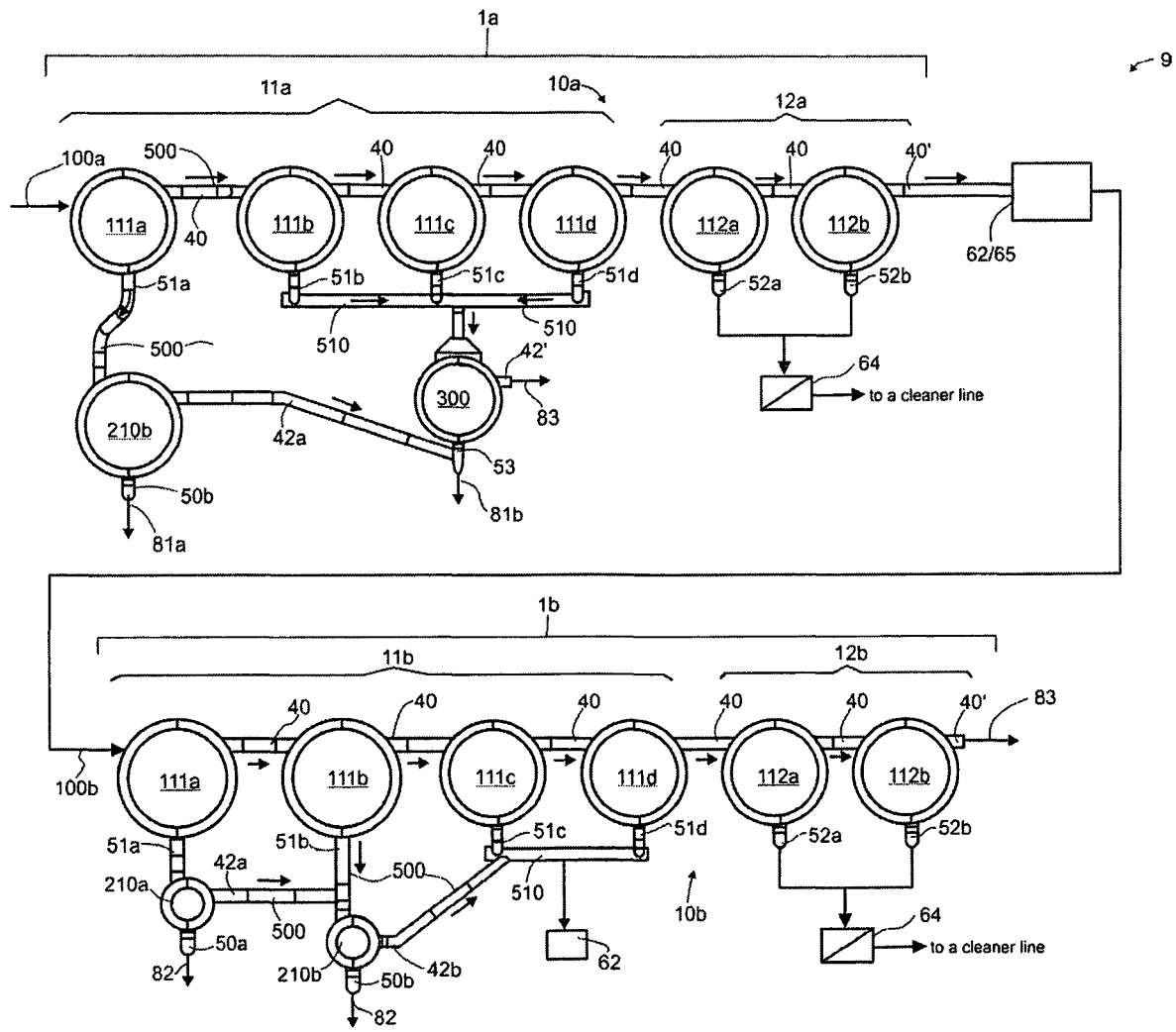
FIG. 7 is a flow chart illustration for an embodiment of a flotation plant according to the invention.
Figure 8:
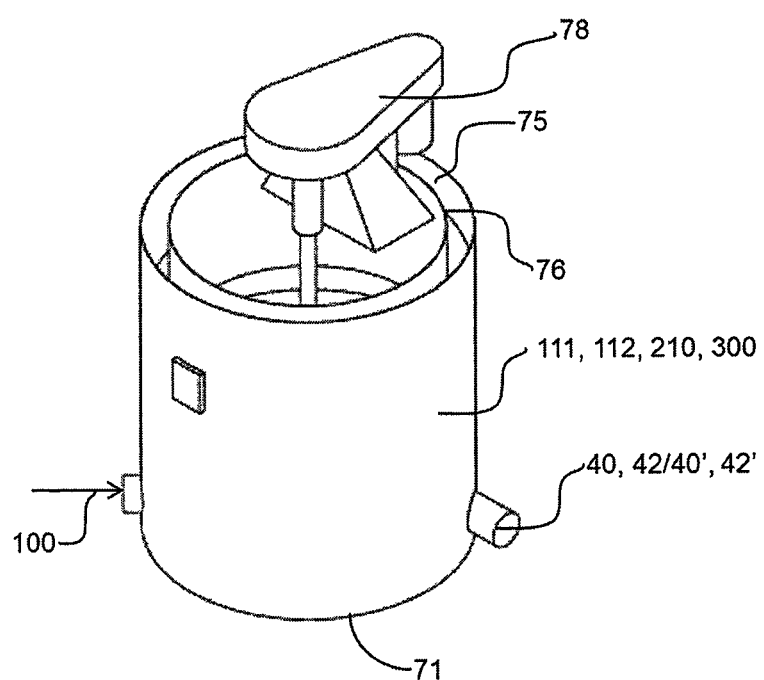
FIG. 8 is a simplified schematic perspective projection of a flotation tank.

The enclosed FIGS. 1-6 illustrate a flotation arrangement 1, and FIG. 7 illustrates a flotation plant 9 in a schematic manner. In FIG. 8, a flotation cell is presented in some detail. The figures are not drawn to proportion, and many of the components of the flotation cell, the flotation arrangement 1 and the flotation plant 9 are omitted for clarity. In order to fit a figure on a single drawing page, some of the connections between flotation cells, flotation lines or flotation arrangements are presented as graphic lines of disproportional lengths rather than connections of actual dimensions in proportion. The forward direction of flows of slurry is shown in the figures by arrows.

Although flotation is disclosed in the following examples by reference mostly to froth flotation, it should be noted that the principles according to the invention can be implemented regardless of the specific type of the flotation, i.e. the flotation technique can be any of the known per se flotation techniques, such as froth flotation, dissolved air flotation or induced gas flotation.

Figure 1:
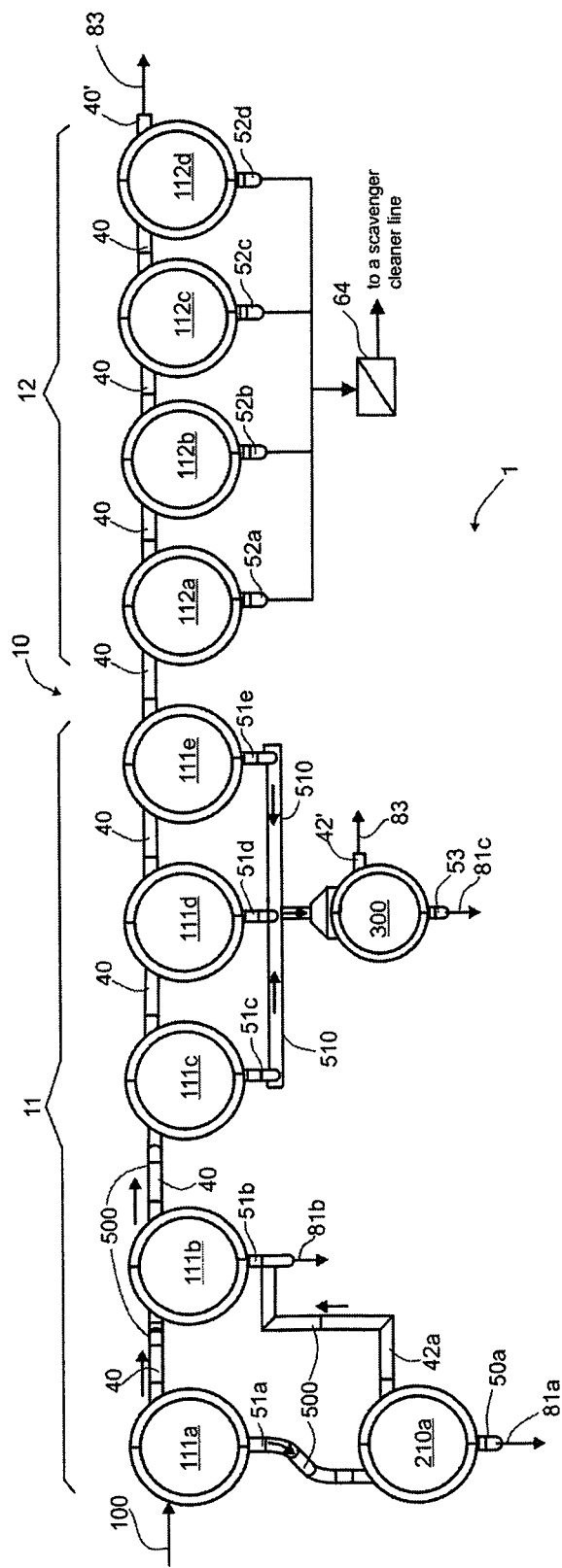
FIG. 1 is a flow chart illustration for an embodiment of the invention.

The basic operational principle of the flotation arrangement 1 is presented in FIG. 1. The following description is to be read mainly in relation to that figure unless otherwise stated.

A first rougher primary flotation cell 111a of a primary flotation line 10 receives a flow of suspension, that is, a slurry inflow 100 comprising ore particles, water and, in some instances, flotation chemicals such as collector chemicals and non-collector flotation reagents for separating the slurry into an underflow 40 and an overflow 51a. A typical flotation cell 111, 112, 210, 300 is presented in FIG. 8. The flotation cell may comprise a mixer 78 in the form of a mechanical agitator as is shown in FIG. 8, or any other suitable mixer for promoting the collisions between flotation gas bubbles and ore particles. In an embodiment, flotation gas may be fed or introduced into the flotation cell where the slurry is separated into overflow and underflow. In an embodiment, flotation gas may be fed into a part of the flotation cell into which a mixer is arranged, i.e. into a preparation flotation cell preceding a flotation cell in which the ore particles are floated and thus separated into overflow and underflow.

In a flotation process where conventional flotation with flotation chemicals is employed, a similar process of froth flotation takes place: the collector chemical molecules adhere to surface areas on ore particles having the valuable mineral, through an adsorption process. The valuable mineral acts as the adsorbent while the collector chemical acts as the adsorbate. The collector chemical molecules form a film on the valuable mineral areas on the surface of the ore particle. The collector chemical molecules have a non-polar part and a polar part. The polar parts of the collector molecules adsorb to the surface areas of ore particles having the valuable minerals. The non-polar parts are hydrophobic and are thus repelled from water. The repelling causes the hydrophobic tails of the collector molecules to adhere to flotation gas bubbles. An example of a flotation gas is atmosphere air pumped to flotation cell. A sufficient amount of adsorbed collector molecules on sufficiently large valuable mineral surface areas on an ore particle may cause the ore particle to become attached to a flotation gas bubble. It is also conceivable that the flotation process may be performed without flotation chemicals. It is also possible to perform the flotation process as reverse flotation. In the following, most of the examples are disclosed in view of conventional flotation, unless stated that the examples specifically relate to reverse flotation. All of the embodiments and examples given may, however, be realized in a reverse flotation process as well.

Ore particles become attached or adhered to gas bubbles to form gas bubble-ore particle agglomerates. These agglomerates rise to the surface of the flotation cells 111, 112, 210, 300 at the uppermost part of the cell by buoyancy of the gas bubbles, as well as with the continuous upwards flow of slurry which may be induced by both mechanical agitation and the infeed of slurry into the cell 111, 112, 210, 300.

The gas bubbles may form a layer of froth. Froth gathered to a surface of slurry in the flotation cell 111, 112, 210, 300, comprising the gas bubble-ore particle agglomerates is let to flow out of flotation cell 111, 112, 210, 300, over a launder lip 76 and into a launder 75. It is also conceivable that the flotation cells are used as so-called overflow flotation cells, where no continuous coherent layer of froth is formed on the slurry surface but actual slurry comprising ore particles with valuable minerals floated in the flotation cell is driven over the launder lip 76.

From the surface of the slurry at the top part of a rougher primary flotation cell 111*a-e*, the valuable mineral containing ore particles overflow the launder lip 76 of the flotation cell to be collected into the launder 75. In the case of reverse flotation, naturally, the ore particles not containing valuable mineral are collected into the overflow, while the ore particles containing the valuable mineral become recovered via an underflow.

This fraction of the slurry is called primary overflow 51*a-e*. From a rougher cleaner flotation cell 210*a* overflow 50*a* is collected in the same way. By a launder lip 76 is herein meant the peripheral edge of a flotation cell 111, 112, 210, 300 at the upper part of the cell over which froth overflow with valuable material particles flows to the launder 75.

Primary overflow 51*a* from at least one rougher primary overflow flotation cell 111*a* is arranged to flow directly into a first rougher cleaner flotation cell 210*a*, which flotation cell is arranged in fluid communication with the rougher primary flotation cell 111*a*.

The overflow 50*a* from the first rougher cleaner flotation cell 210*a* is recovered as a first concentrate 81*a*. The first concentrate 81*a* of ore particles comprising valuable mineral is in a form of a fluid which is led to further flotation lines or stages according to embodiments of the invention, or to other further treatment according to solutions known in the art.

The flotation arrangement 1 may further comprise a second rougher cleaner flotation cell 210*b* into which primary overflow 51*b* of at least one further rougher primary flotation cell 111*b* is arranged to flow. The second rougher cleaner flotation cell 210*b* is in fluid communication with the further rougher primary flotation cell 111*b*. Overflow 50*b* from the second rougher cleaner flotation cell 210*b* is recovered as a second concentrate 81*b*, which may be different in characteristics from the first concentrate 81*a*.

In addition, the flotation arrangement 1 may comprise an additional rougher cleaner flotation cell 300, arranged to receive primary overflow 51 from at least one rougher primary flotation cell 111 downstream from the rougher primary flotation cell 111*a* from which a first rougher cleaner flotation cell 210*a* is arranged to receive primary overflow 51*a*. Overflow 53 from the additional rougher cleaner flotation cell 300 is recovered as a third concentrate 81*c*, which may be different in characteristics from the first and/or second concentrates 81*a*, 81*b*.

Figure 4:
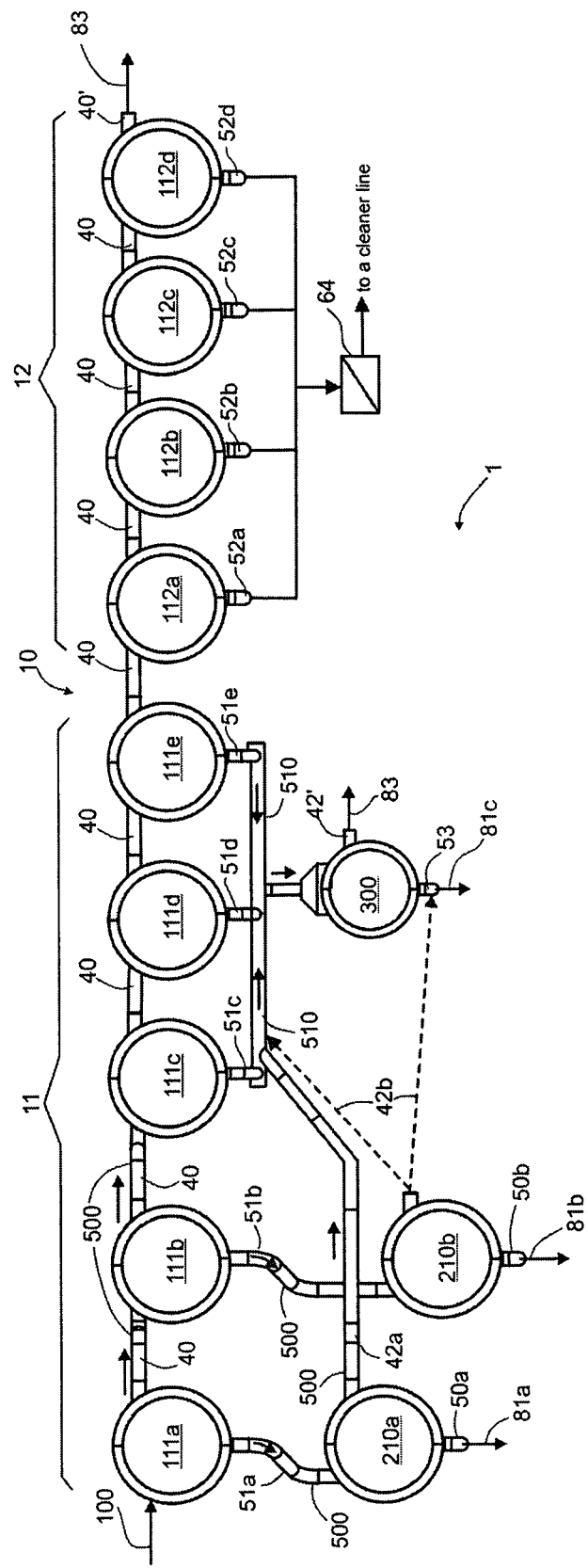
FIG. 4 is a flow chart illustration for an embodiment of the invention.

The additional rougher cleaner cell 300 may be arranged to receive primary overflow 51*c* from at least one further rougher primary flotation cell 111*c* from which primary overflow 51 is not arranged to flow into the first or the second rougher cleaner flotation cell 210*a*, 210*c* (see FIGS. 1, 4).

Figure 2:
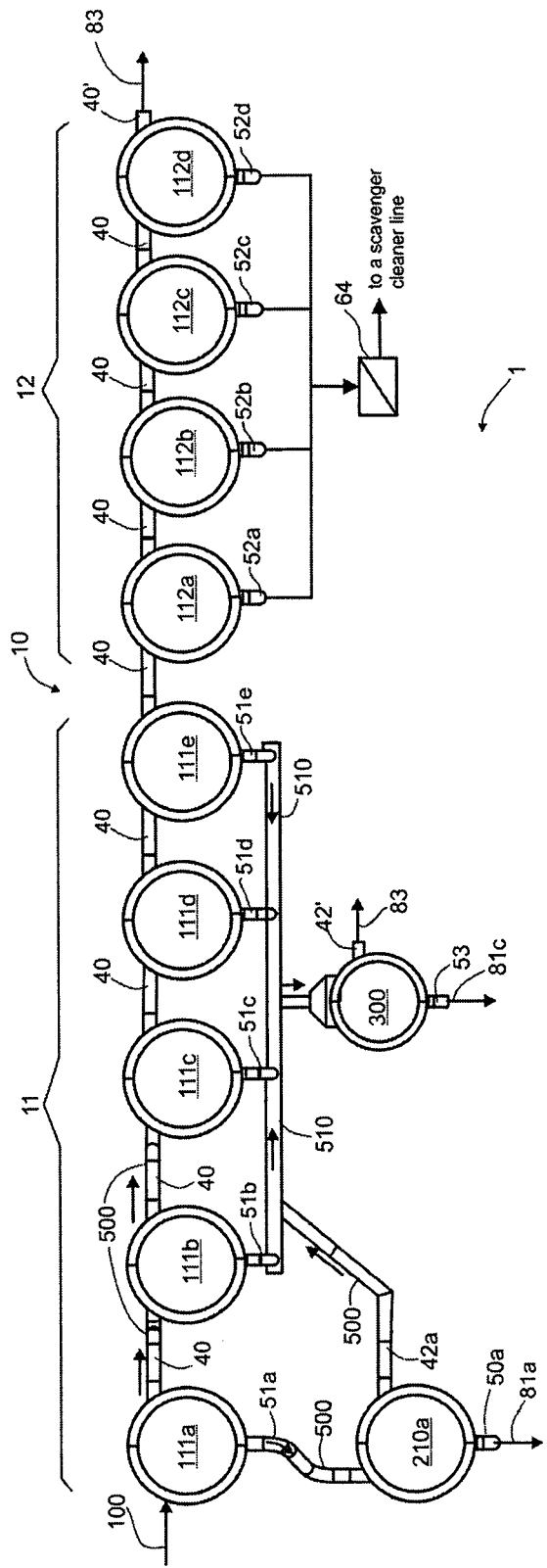
FIG. 2 is a flow chart illustration for an embodiment of the invention.
Figure 3:
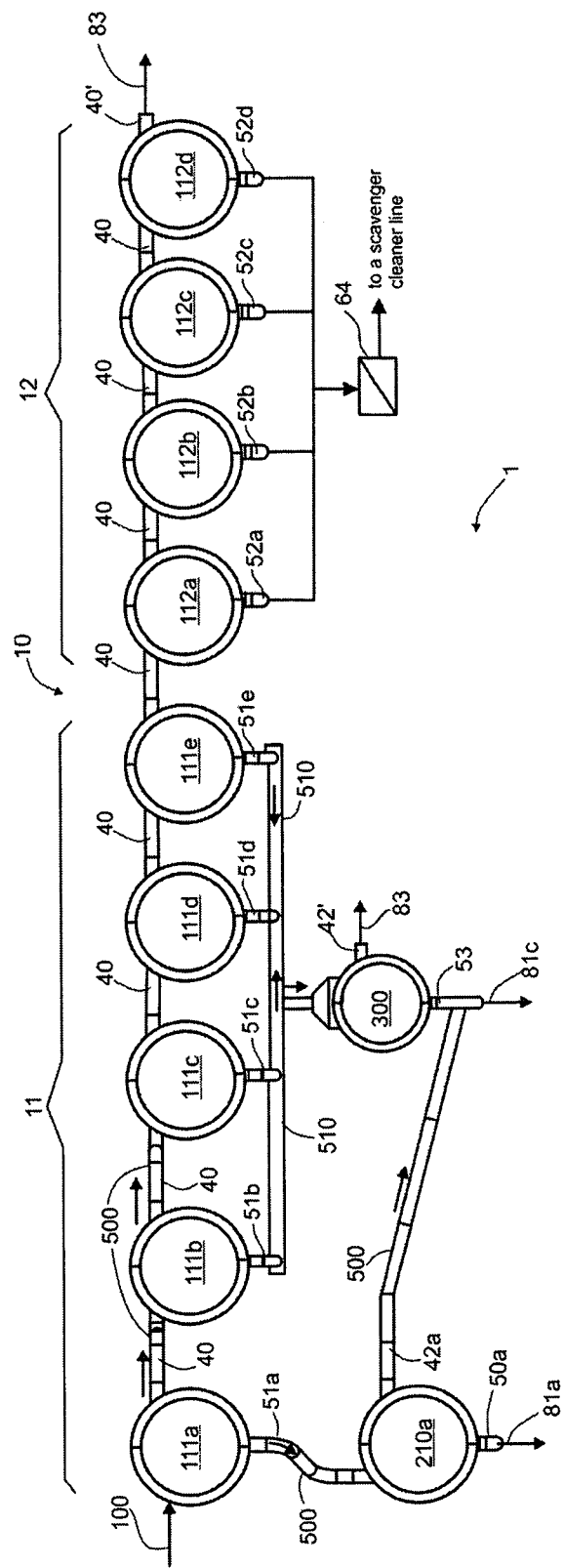
FIG. 3 is a flow chart illustration for an embodiment of the invention.

Alternatively of additionally, the first rougher cleaner flotation cell 210*a* may be arranged to receive primary overflow 51*a* from the first rougher primary flotation cell 111*a*, and the additional rougher cleaner flotation cell 300 may be arranged to receive primary overflow 51*b*, 51*c* from at least two further rougher primary flotation cells 111*b*, 111*c* (in FIG. 2, an embodiment is shown wherein the additional rougher cleaner flotation cell 300 receives primary overflow 51*b-3* from four further rougher primary flotation cells 111*b-e*).

From the area located close to a flotation cell bottom 71, a gangue or a part of the slurry containing ore particles that do not rise onto the surface of the slurry is led out of the rougher primary flotation cell 111*a* as underflow 40. Underflow 40 is led into a subsequent rougher primary flotation cell 111*b* that receives underflow 40 as an infeed from the previous rougher primary flotation cell 111*a*. The slurry is treated in the subsequent rougher primary flotation cell 111*b* similarly as in the first rougher primary flotation cell 111*a*, in a manner well known to a person skilled in the art.

The primary flotation line 10 comprises a rougher part 11 with at least two rougher primary flotation cells 111*a*, 111*b* connected in series an arranged in fluid communication, followed by a scavenger part 12 with at least two scavenger primary flotation cells 112*a*, 112*b* connected in series and arranged in fluid communication. The last rougher primary flotation cell 111*e* is connected in series and arranged in fluid communication with the first scavenger primary flotation cell 112*a*, the rougher primary flotation cells 111 of the rougher part 11 and the scavenger primary flotation cells 112 of the scavenger part 12 thereby comprising a continuous treatment line. Overflow 51*a* from the first rougher primary flotation cell 111*a* may be arranged to flow directly into a rougher cleaner flotation cell 210*a* flotation, or even into an additional rougher cleaner cell 300.

Overflow 52*a-d* from the scavenger primary flotation cells 112*a-d* may be arranged to flow back into a rougher primary flotation cell 111*a-f* (see FIG. 6). Alternatively, overflow 52*a-d* from the scavenger primary flotation cells 112*a-d* may be arranged to flow into a regrinding step 64 and then into a scavenger cleaner flotation line (see FIGS. 1-5).

Primary overflow 52 from at least one scavenger primary flotation cell 112 may be arranged to flow directly into a regrinding step 64. In an embodiment, the combined primary overflows 52*a-d* from the scavenger primary flotation cells 112*a-d* of the scavenger part 12 may be arranged to flow directly into a regrinding step 64.

The primary line 10 may comprise at least four primary flotation cells 111, 112. Alternatively, the primary flotation line 10 may comprise 4-10 primary flotation cells 111, 112. Alternatively, the primary flotation line 10 may comprise 4-7 primary flotation cells 111, 112. The rougher part 11 may comprise at least two rougher primary flotation cells 111*a*, 11*b*. Alternatively, the rougher part 11 may comprise 2-6 rougher primary flotation cells 111*a-f*. Alternatively, the rougher part 11 may comprise 2-4 rougher primary flotation cells 111*a-d*. The scavenger part 12 may comprise at least two scavenger primary flotation cells 112*a-b*. Alternatively, the scavenger part 12 may comprise 2-6 scavenger primary flotation cells 112*a-d*. Alternatively, the scavenger part 12 may comprise 2-4 scavenger primary flotation cells 112*a-d*.

The rougher and/or scavenger primary flotation cells 111*a-f*, 112*a-d* are connected in series. The fluid connection may be realized by a conduit 500 (pipe or tube, as is shown in the figures) so that the subsequent primary flotation cells 111*a-f*, 112*a-d* are arranged at a distance from each other. Alternatively, any two adjoining or subsequent primary flotation cells 111*a-f*, 112*a-d* may be arranged into direct cell connection so that no separate conduit between the two flotation cells 111*a-e*, 112*a-e* is needed (not shown in figures).

In embodiments of the invention, where the primary flotation line 10 comprises more than two rougher primary flotation cells 111*a-f*, all of the adjoining or subsequent primary flotation cells 111*a-f*, 112*a-d* may be arranged into fluid connection with conduits 500 arranged between the flotation cells for directing an underflow 40 from one flotation cell to the next flotation cell. Alternatively, all of the flotation cells 111*a-f*, 112*a-d* may be arranged into direct cell connection with the adjoining flotation cells. Alternatively, some of the adjoining flotation cells 111*a-f*, 112*a-d* may arranged in direct cell connection with the neighboring flotation cells, while other adjoining flotation cells may have a conduit 500 for realizing the fluid connection. The arrangement and design of the primary flotation line 10 may depend on the overall process requirements and physical location of the flotation arrangement 1.

Further, a first rougher cleaner flotation cell 210*a*, as well as a second or any further rougher cleaner flotation cell 210*b*, as well as an additional rougher cleaner cell 300 may be arranged in direct fluid communication with the first rougher primary flotation cell 111*a*, 111*b* from which the rougher cleaner flotation cell 210*a*, 210*b*, 300 receives overflow 51*a*, 51*b*, i.e. there are no further processing steps such as a grinding step or a conditioning step arranged between the rougher flotation cells 111 of the primary flotation line 10 and the rougher cleaner flotation cells 210, 300.

From the last scavenger primary flotation cell 112*d* of the flotation line 10, underflow 40' (which may be reject in normal flotation, or accept in reverse flotation) is led out of the flotation arrangement 1 as a tailings flow 83 which may be further treated in any suitable manner known in the art.

The first rougher primary flotation cell 111*a* may be at least 150 m$^3$ in volume. Alternatively, the first rougher primary flotation cell 111*a* may be at least 500 m$^3$ in volume. Alternatively, the first rougher primary flotation cell 111*a* may be at least 2000 m$^3$ in volume.

The second rougher primary flotation cell 111*b*, or any one of the subsequent rougher primary flotation cells 111*b-e* downstream of the first rougher primary flotation cell 111*a*, may be at least 100 m$^3$ in volume. Alternatively, the second rougher primary cell 111*b*, or any one of the subsequent rougher primary flotation cells 111*b-e* downstream of the first rougher primary flotation cell 111*a*, may be at least 300 m$^3$ in volume. Alternatively, the second rougher primary cell 111*b*, or any one of the subsequent rougher primary flotation cells 111*b-e* downstream of the first rougher primary flotation cell 111*a*, may be at least 500 m$^3$ in volume.

In embodiments of the invention, the second primary flotation cell 111*b*, some of the of the subsequent rougher primary flotation cells 111*b-e* downstream of the first rougher primary flotation cell 111*a*, or all of the of the subsequent rougher primary flotation cells 111*b-e* downstream of the first rougher primary flotation cell 111*a*, may be equal in volume as the first rougher primary flotation cell 111*a*. In embodiments of the invention, the second primary flotation cell 111*b*, some of the of the subsequent rougher primary flotation cells 111*b-e* downstream of the first rougher primary flotation cell 111*a*, or all of the of the subsequent rougher primary flotation cells 111*b-e* downstream of the first rougher primary flotation cell 111*a*, may be smaller in volume than the first primary flotation cell 111*a*.

Primary overflow 51*a* from the first rougher primary flotation cell 111*a* is directed to a first rougher cleaner flotation cell 210*a*. The first rougher flotation cell 210*a* is arranged in direct fluid communication with at least one first rougher primary flotation cell 111*a*. The first rougher cleaner flotation cell 210*a* is arranged to receive primary overflow 51*a* of the at least one first rougher primary flotation cell 111*a* as inflow, for the recovery of a first concentrate 81*a* comprising ore particles with valuable mineral or minerals. The first rougher cleaner flotation cell 210*a*, as well as any other rougher cleaner flotation cells, operates on standard flotation principles, as described earlier in this disclosure. An overflow 50*a* of the first rougher cleaner flotation cell 210*a* is collected as the first concentrate 81*a*, which may then be led to any suitable further processing step known in the art.

The first rougher cleaner flotation cell 210*a* is arranged in fluid communication with at least one rougher primary flotation cell 111*a*, and arranged to receive primary overflow 51*a* from the at least one rougher primary flotation cell 111*a* for the recovery of a first concentrate 81*a*. A second rougher cleaner flotation cell 210*b* may arranged in fluid communication with at least one further rougher primary flotation cell 111*b*, and arranged to receive primary overflow 51*b* from the at least one further rougher primary flotation cell 111*b* for the recovery of a second concentrate 81*b*.

Secondary underflow 42*a* from the first rougher cleaner flotation cell 210*a* may be arranged to be combined into overflow 51*b* from a rougher primary flotation cell 111*b* downstream from the rougher primary flotation cell 111*a* from which the first rougher cleaner flotation cell 210*a* is arranged to receive primary overflow 51*a* (see FIGS. 1, 5). Alternatively, secondary underflow 42*a* from the first rougher cleaner flotation cell 20*a* may be arranged to be combined into combined overflows 51*b-e* from rougher primary flotation cells 111*b-e* downstream from the rougher primary flotation cell 111*a* from which the first rougher cleaner flotation cell 210*a* is arranged to receive primary overflow 51*a* (see FIGS. 2, 4, 6). Alternatively, secondary underflow 42*a* from the first rougher cleaner flotation cell 20*a* may be arranged to be combined into overflow 53 from an additional rougher cleaner cell 300 arranged to receive primary overflow 51*b-e* from at least one rougher primary flotation cell 111*b-e* downstream from the rougher primary flotation cell 111*a* from which the first rougher cleaner flotation cell 201*a* is arranged to receive primary overflow 51*a* (see FIG. 3).

In case primary overflow 51*b* of at least one further rougher primary flotation cell 111*b* is arranged to flow into a second rougher cleaner cell 210*b*, underflow 42*b* from the second rougher cleaner cell 210*b* may be arranged to be combined into overflow 51*c* from a rougher primary flotation cell 111*c* downstream from the further rougher primary flotation cell 111*b* from which the second rougher cleaner flotation cell 210*b* is arranged to receive primary overflow 51*b* (this embodiment is not shown in the figures). Alternatively, underflow 42*b* from the second rougher cleaner cell 210*b* may be arranged to be combined into combined overflows 51*c*-51*e* from rougher primary flotation cells 111*c*-*e* downstream from the further rougher primary flotation cell 111*b* from which the second rougher cleaner cell 210*b* is arranged to receive primary overflow 51*b* (see FIGS. 4, 5). Alternatively, underflow 42*b* from the second rougher cleaner cell 210*b* may be arranged to be combined into overflow 53 from the additional rougher cleaner cell 300 arranged to receive primary overflow 51*c*-*e* from one or more rougher primary flotation cells 111*c*-*e* downstream from the further rougher primary flotation cell 111*b* from which the second rougher cleaner flotation cell 210*b* is arranged to receive primary overflow 51*b* (see FIGS. 4, 5, where this alternative is shown as dashed arrows).

Secondary underflows 42*a*, 42*b* may be arranged to be combined with primary overflows 51*a*-*e* as described above by leading the flow of slurry into the conduit 500 between the different flotation cells, or into a collecting conduit 510 disposed to collect overflows 51*b*-*e* from a number of rougher primary flotation cells 111*b*-*e*, as can be seen from the accompanying figures.

In an embodiment, the underflow 42' from the additional rougher cleaner flotation cell 300 may be arranged to flow out of the flotation arrangement 1 as a tailings flow 83.

A first rougher cleaner flotation cell 210*a* in fluid communication with a rougher primary flotation cell 111*a* may be 100-2000 m³ in volume. Alternatively, the first rougher cleaner flotation cell 210*a* may be 400-1000 m³ in volume. A second rougher cleaner flotation cell 210*b* in fluid communication with a further rougher primary flotation cell 111*b* may be 100-2000 m³ in volume. Alternatively, the second rougher cleaner flotation cell 210*b* may be 300-1000 m³ in volume.

The volume of a first rougher cleaner flotation cell 210*a* in fluid communication with at least one rougher primary flotation cell 111*a* may be 2-50% of the aggregate volume of the at least one rougher primary flotation cell 111*a*. Alternatively, the volume of the first rougher cleaner flotation cell 210*a* in fluid communication with at least one rougher primary flotation cell 111*a* may be 3-30% of the aggregate volume of the at least one rougher primary flotation cell 111*a* (see FIG. 7, where the second flotation arrangement of the plant 9 comprises such rougher cleaner flotation cells 210*a*, 210*b*).

The volume of a second rougher cleaner flotation cell 210*b* in fluid communication with at least one rougher primary flotation cell 111 may be 2-50% of the aggregate volume of the at least one rougher primary flotation cell 111. Alternatively, the volume of the second rougher cleaner flotation cell 210*b* may be 3-30% of the aggregate volume of the at least one primary flotation cell 111.

By aggregate volume herein is meant the combined volume of the rougher primary flotation cells 111*a* from which the rougher cleaner flotation cell 210*a*, 210*b* receives overflow 51. For example, the first rougher cleaner flotation cell 210*a* may receive overflows 51*a* from more than one rougher primary flotation cells 111 of the primary line 10. In that case, the aggregate volume is the combined volume of the rougher primary flotation cells 111.

A rougher cleaner flotation cell 210*a*, 210*b* may be arranged to receive primary overflow 51 from 1-3 rougher primary flotation cells 111. In an embodiment, a rougher cleaner flotation cell 210*a*, 210*b* may be arranged to receive primary overflow from 1-2 rougher primary flotation cells 111. In an embodiment, a rougher cleaner flotation cell 210*a*, 210*b* may be arranged to receive primary overflow 51*a*, 51*b* from at most two rougher primary flotation cells 111*a*, 111*b*. In an embodiment, a rougher cleaner flotation cell 210*a* may be arranged to receive primary overflow 51*a* from one single rougher primary flotation cell 111*a*.

Alternatively or additionally, the further rougher cleaner flotation cell 210*b* may be arranged to receive primary overflow 51*b*, 51*c* from at least two rougher primary flotation cells 111*b*, 111*c* (see FIG. 12). The further rougher cleaner flotation cell 210*b* may be arranged to receive primary overflow 51*b*-*d* from 1-4 rougher primary flotation cells 111*b*-*d*. In an embodiment, the further rougher cleaner flotation cell 210*b* may be arranged to receive primary overflow 51*b*-*d* from 1-2 rougher primary flotation cells 110*b*-*c*. An embodiment where the further rougher cleaner flotation cell 210*b* receives primary overflow 51*b* from one rougher primary flotation cell 111*b* is depicted for example in FIGS. 1*a*-*b* and 2*a*-*c*. In an embodiment, a second rougher cleaner flotation cell 210*a* may be arranged to receive primary overflow 51 from at least two rougher primary flotation cells 111.

The volume of a first rougher cleaner flotation cell 210*a* may be larger than the volume of a second rougher cleaner flotation cell 210*b*. In an alternative embodiment, the volume of a second rougher cleaner flotation cell 210*b* may be larger than the volume of a first rougher cleaner flotation cell 210*a*.

In an embodiment, primary overflow 51*a* from a primary flotation cell 111*a* may be arranged to flow into two parallel rougher cleaner flotation cells 210*a*. This embodiment is not shown in the figures. Such embodiment could easily be conceivable for example into the embodiment presented in FIG. 1 by arranging a second first rougher cleaner flotation cell 210*a* next to or in the vicinity of the single rougher cleaner flotation tank 210*a*, and directing overflow 51*a* via a collecting conduit 510 into the two parallel rougher cleaner flotation cells 210*a*. A first concentration 81 as overflow 50*a* from both of the two parallel first rougher cleaner flotation cells 210*a* would be separately collected and directed further, while the underflows 42*a* from both of the two parallel first rougher cleaner flotation cells 210*a* could be either collected and directed downstream into a suitable point via a collecting conduit 510, or directed downstream into a suitable point separately.

Flows of slurry, both underflows 40, 42, and overflows 50, 51, 52, 53 may be arranged to be driven by gravity. That is any flow between any at least two flotation cells in fluid connection may be driven by gravity. For example, flow of slurry between the first rougher primary flotation cell 111*a* and a further rougher primary flotation cell 111*b* may be driven by gravity. Alternatively of additionally, flow of slurry between a first scavenger primary flotation cell 112*a* and a further scavenger primary flotation cell 112*b* may be driven by gravity. Alternatively of additionally, flow of slurry between a rougher primary flotation cell 111*e* and a scavenger flotation cell 112*a* may be driven by gravity. Alternatively of additionally, flow of slurry between a rougher primary flotation cell 111 and a rougher cleaner flotation cell 210 in fluid connection with each other may be driven by gravity. For example, flow of slurry between the first rougher primary flotation cell 111*a* of the primary flotation line 10 and a first rougher cleaner flotation cell 210*a* may be driven by gravity. For example, flow of slurry between a further rougher primary flotation cell 111*b* of the primary flotation line 10 and a further rougher cleaner flotation cell 210*b* may be driven by gravity.

To facilitate the movement by gravity of flows of slurry, at least some of the flotation cells 111, 112 210, 300 may be arranged in a stepwise fashion in relation to the ground level on which the flotation arrangement is established. Alternatively, the launder lips 76 of the flotation cells, for example primary flotation cells 111a-c, may be arranged at different heights.

A step realized in between any adjacent flotation cell causes a difference in the slurry surface level 70 of the two adjacent flotation cells. For example, a step may be arranged between rougher primary flotation cells 111 of the primary flotation line 10, as well as between two rougher cleaner flotation cells 210a, 210b. It is equally conceivable that the step may be arranged between a rougher primary flotation cell 111 of a primary flotation line and at least one rougher cleaner flotation cell 210a; or between adjacent rougher cleaner flotation cells 210a, 210b; or between the last rougher primary flotation cell 111e and the first scavenger primary flotation cell 112a; or between two scavenger primary flotation cells 112 of the scavenger part 12 of the primary flotation line 10.

It is obvious to a person skilled in the art that the vertical positioning of the different flotation cells 111, 112, 210, 300 may be realized in the best possible manner taking into account the requirements of the flotation process and the construction location of the flotation arrangement 1.

The gravitational flow of slurry is achieved by the hydraulic gradient between any two flotation cells with different slurry surface levels, realized with a step between the flotation cell bottoms 71, or with a step between the launder lip heights, and as has been explained earlier in the summary part of this disclosure.

Alternatively or additionally to the above-described manner of flows of slurry driven by gravity, the flows of slurry may be driven, in the same set-up of flotation cells, by one or more low-head pumps arranged between any two adjoining flotation cells, either into the conduit or conduits 500, or directly between the adjoining flotation cells in case the adjoining cells are arranged in direct cell connection with each other. Pumping may be required when the flotation cells or some of the flotation cells are arranged in an uniplanar fashion, i.e. having the bottoms of the cells 70 at a single level in relation to the ground level, whereby the slurry surface level of two adjoining flotation cells may be more or less the same and now hydraulic gradient is created, at least not sufficiently to drive the flow of slurry by gravity. In an embodiment, the flows of slurry may be driven by gravity between some of the adjoining flotation cells, and by low-head pump or pumps between some of the adjoining flotation cells in the flotation arrangement 1.

The flotation arrangement 1 may also comprise a further processing step 62. For example, overflow 51c of at least one rougher primary flotation cell 111c may be directed to flow into this further processing step 62. In an embodiment, combined overflows of the at least one rougher primary flotation cell 111c, and that of at least one further rougher primary flotation cell 111d downstream from rougher primary flotation cell 111c may be directed to flow into the further processing step 62. In FIG. 7, a flotation arrangement 1b is shown, where the overflows 51c, 51d of the above-described rougher primary flotation cells 111c, 111d of a primary flotation line 10b are combined and led into the further processing step 62 via a collecting conduit 510. The further processing step 62 may be for example cleaner flotation, performed in a cleaner flotation line.

Alternatively or additionally, the combined secondary overflows 50a, 50b of the at least two rougher cleaner flotation cells 210a, 210b may be arranged to flow into a further processing step 62.

Underflow 40' from the last primary flotation cell of the primary flotation line 10, that is, the last scavenger primary flotation cell 112d, may be arranged to flow into a further processing step 62, or it can be arranged to leave the flotation arrangement 1 as tailings 83. Additionally or alternatively, underflow 42' from the additional rougher cleaner flotation cell 300 may be arranged to flow into a further processing step 62, or it can be arranged to leave the flotation arrangement 1 as tailings 83.

Also underflows 42a, 42b from the rougher cleaner cell 210a or cells 210a, 210b may be subjected to a further processing step 62, that is, a re-grinding step prior to directing underflows 42a, 42b further in the flotation arrangement, in order to liberate valuable mineral comprising particles efficiently. For example, underflow 42a from a first rougher cleaner flotation cell 210a may be reground before it is led into the combined overflows 51c-e from further rougher primary flotation cells 111c-e, to be treated in the additional rougher cleaner flotation cell 300. According to an embodiment, the combined flow of slurry comprising underflow 42 from one or more rougher cleaner flotation cells 210 and overflow 51 from one or more rougher primary flotation cells 111 may be first subjected to a re-grinding step 62, and only after that led into an additional rougher cleaner flotation cell 300 as infeed.

The further processing step 62 may comprise, for example, a grinding step. Alternatively or additionally, the further processing step 62 may comprise a conditioning step. Alternatively or additionally, the further processing step 62 may comprise a flotation step, such as a cleaner flotation step. In other words, the further processing step 62 may comprise several individual process steps in combination, as well.

According to an embodiment of the invention, the flotation arrangement 1 may comprise two primary flotation lines 10a, 10b. The first rougher cleaner flotation cell 210a receive overflow 51a, from the first rougher primary flotation cells 111a, 121a of both primary lines 10a, 10b (not shown in the figures). In an embodiment, the flotation arrangement 1 may comprise two additional rougher cleaner flotation cells 300a, 300b that are arranged to receive combined overflows from the further rougher primary flotation cells 111b-e, and 121b-e, respectively, from both primary flotation lines 10a, 10b. Secondary underflow 42a from the first rougher cleaner flotation cell 210a may be arranged to be combined into overflow 53 of both of the additional rougher cleaner flotation cells 300a, 300b. Underflows 42' from the additional rougher cleaner flotation cells 300a, 300b may be arranged to flow into a further processing step 62 similarly to what has been described above, either separately, or the two flows may be combined; or arranged to leave the flotation arrangement 1 as tailings 83, separately from both additional rougher cleaner flotation cells 300a, 300b. The tailings flow 83 of the additional rougher cleaner flotation cells 300a, 300b may also be combined and then led to leave the flotation arrangement as a combined tailings flow 83.

At least one of the rougher primary flotation cells 111a-f, and/or at least one of the rougher cleaner flotation cells 210a-b, 300 may comprise a froth flotation cell, or a so-called conventional flotation cell, the operation of which has been described in the Summary section of this disclosure. In an embodiment, a third rougher primary flotation cell 111c of the primary flotation line 10 comprises a froth flotation cell. In addition, any subsequent rougher primary flotation cell 111d-e after the third rougher primary flotation cell 111c may comprise a froth flotation cell. In an embodiment, the first rougher primary flotation cell 111a and a second rougher primary flotation cell 111b of the primary flotation line 10 may be operated as overflow flotation cells, the details of which have been also described in the Summary section of this disclosure.

In an embodiment, flotation gas may be fed into the flotation cell where the slurry is separated into overflow and underflow. The flotation cell into which flotation gas is fed may comprise a mixer. Alternatively, the flotation gas may be fed into a preparation flotation cell into which a mixer is arranged.

The flotation arrangement 1 described herein is particularly suitable for, but not limited to, use in recovering valuable mineral containing ores, where the mineral ore particles comprise copper (Cu), zinc (Zn), iron (Fe), pyrite, or a metal sulfide such as gold sulfide. Mineral ore particles comprising other valuable mineral such as Pb, Pt, PGMs (platinum group metals Ru, Rh, Pd, Os, Ir, Pt), oxide mineral, industrial minerals such as Li (i.e. spodumene), petalite, and rare earth minerals may also be recovered according to the different aspects of this invention.

The flotation arrangement is suitable for use in recovering mineral ore particles comprising a valuable mineral, particularly from low grade ore. The flotation arrangement is particularly suitable for recovering mineral ore particles comprising Cu from low grade ore. The flotation arrangement is also suitable for recovering mineral ore particles comprising Fe by reverse flotation.

An embodiment of the use of a flotation arrangement according to this disclosure may utilize, in the flotation arrangement, a first rougher primary flotation cell 111a which is at least 150 m$^3$ in volume, and gravity to drive the flow of slurry. An embodiment of the use of a flotation arrangement according to this disclosure may utilize, in the flotation arrangement, a first rougher primary flotation cell 111a which is at least 500 m$^3$ in volume, and gravity to drive the flow of slurry. An embodiment of the use of a flotation arrangement according to this disclosure may utilize, in the flotation arrangement, a first rougher primary flotation cell 111a which is at least 2000 m$^3$ in volume, and gravity to drive the flow of slurry.

An embodiment of the use of a flotation arrangement according to this disclosure may utilize, alternatively or additionally, a second rougher primary flotation cell 111b which is at least 100 m$^3$ in volume, and gravity to drive the flow of slurry. An embodiment of the use of a flotation arrangement according to this disclosure may utilize a second rougher primary flotation cell 111b which is at least 300 m$^3$ in volume, and gravity to drive the flow of slurry. An embodiment of the use of a flotation arrangement according to this disclosure may utilize a second rougher primary flotation cell 111b which is at least 500 m$^3$ in volume, and gravity to drive the flow of slurry.

An embodiment of the use of a flotation arrangement according to this disclosure may utilize, alternatively or additionally, gravity to drive the flow of slurry between the rougher primary flotation cells 111a-f.

An embodiment of the use of a flotation arrangement according to this disclosure may utilize, alternatively or additionally, gravity to drive the flow of slurry between the rougher cleaner flotation cells 210a-b, 300. "Between" in the context of this specification is to be understood that the flow of slurry, specifically in the context of flow of secondary underflows 42, is directed into conduits 500 to be combined into other flows of slurry, rather than directly into the neighboring flotation cell, as can clearly be seen from the accompanying figures.

An embodiment of the use of a flotation arrangement according to this disclosure may utilize, alternatively or additionally, gravity to drive the flow of slurry between a rougher primary flotation cell 111 and a first rougher cleaner flotation cell 210, the two flotation cells having a fluid connection with each other. An embodiment of the use of a flotation arrangement according to this disclosure may utilize gravity to drive the flow of slurry between the first rougher primary flotation cell 111a and a first rougher cleaner flotation cell 210a. Alternatively or additionally, a further embodiment of the use of a flotation arrangement according to this disclosure may utilize gravity to drive the flow of slurry between a further rougher primary flotation cell 110b-f and a second rougher cleaner flotation cell 210b or an additional rougher cleaner flotation cell 300.

According to a further aspect of the invention, a flotation plant 9 comprises a flotation arrangement 1 according to this specification. In an embodiment, the flotation plant 9 may comprise at least two flotation arrangements 1. In an embodiment, the flotation plant 9 may comprise at least three flotation arrangements 1. In an embodiment, the flotation plant 9 may comprise at least one first flotation arrangement 1a for the recovery of a first concentrate 81, and at least one second flotation arrangement 1b for the recovery of a second concentrate 82 (see FIG. 7).

In an embodiment, the primary flotation cells 111, 112 of the primary flotation line 10a of the at least one first flotation arrangement 1a for the recovery of the first concentrate 81 and the primary flotation cells 111, 122 of the primary flotation line 10b of the at least one second flotation arrangement 1b for the recovery of the second concentrate 82 are arranged in series (see FIG. 7).

The flotation plant 9 may comprise a flotation arrangement 1 arranged to recover Cu. Alternatively or additionally, the flotation plant 9 may comprise a flotation arrangement 1 arranged to recover Zn. Alternatively or additionally, the flotation plant 9 may comprise a flotation arrangement 1 arranged to recover pyrite. Alternatively or additionally, the flotation plant 9 may comprise a flotation arrangement 1 arranged to recover a metal from a sulfide, such as gold. According to a further embodiment of the invention, the flotation plant 9 may comprise a flotation arrangement 1 arranged to recover mineral ore particles comprising Cu from low grade ore. According to an embodiment of the invention, the flotation plant 9 may comprise a flotation arrangement 1 arranged to recover Fe by reverse flotation.

The flotation plant 9 may further comprise an arrangement for further treating the mineral ore particles suspended in slurry so that the second concentrate 82 is different from the first concentrate 81. In an embodiment, the arrangement for further treating the mineral ore particles may be a grinding step 62 disposed between a first flotation arrangement 1a and a second flotation arrangement 1b. In an embodiment, the arrangement for further treating the mineral ore particles may be an arrangement 65 for the addition of flotation chemicals, disposed between a first flotation arrangement 1a and a second flotation arrangement 1b.

According to another aspect of the invention, a flotation method for treating mineral ore particles suspended in slurry is presented. In the method, slurry is subjected to primary flotation 10 comprising at least two rougher flotation stages 111a, 111b in series and in fluid communication for separating the slurry into primary underflow 40 and primary overflow 51*a*, 51*b*, and further comprising at least two scavenger flotation stages 112*a*, 112*b* in series and in fluid communication for separating the slurry into underflow 40 and primary overflow 52*a*, 52*b*.

Primary underflow 40 from a previous primary flotation stage 111*a* may be directed to a subsequent primary flotation stage 111*b*. Primary overflow 51*a* from at least a first rougher flotation flotation stage 111*a* is directed to a rougher cleaner flotation stage 210*a* for the recovery of a first concentrate 81. The at least first rougher flotation stage 111*a* and the first rougher cleaner flotation stage 210*a* are arranged in series and in fluid communication.

The primary flotation 10 comprises at least two rougher flotation stages 111*a*, 111*b* in series and in fluid communication. Primary overflow 51*a* from at least one rougher flotation stage 111*a* is directed to a rougher cleaner flotation stage 210*a*, for the recovery of a first concentrate 81*a*. The at least one rougher flotation stage 111*a* and the rougher cleaner flotation stage 210*a* are in series and in fluid communication.

The primary flotation further comprises at least two scavenger flotation stages 112*a*, 112*b* in series and in fluid communication. Primary overflow 52 from the scavenger stages 112*a*, 112*b* may be directed back to a first rougher stage 111*a*, 111*b*, or into regrinding 64 and then cleaner flotation. Primary underflow 51, 52 from a previous primary flotation stage 111, 112 is directed to a subsequent primary flotation stage.

Underflow 42*a* from a first rougher cleaner flotation stage 210*a* may be combined into overflow 51*b* from a rougher primary flotation stage 111*b* downstream from the rougher primary stage 111*a* from which the first rougher cleaner stage 210*a* receives primary overflow 51*a*. Alternatively, underflow 42*a* from a first rougher cleaner flotation stage 210*a* may be combined into the combined overflows 51*b-e* from rougher primary flotation stages 111*b-e* downstream from the rougher primary flotation stage 111*a* from which the first rougher cleaner stage 210*a* receives overflow. Alternatively, underflow 42*a* from a first rougher cleaner flotation stage 210*a* may be combined into overflow 53 from an additional rougher cleaner stage 300 receiving primary overflow 51*b-e* from at least one rougher primary flotation stage 111*b* downstream from the rougher primary flotation stage 111*a* from which the first rougher cleaner flotation stage 210*a* receives overflow 51*a*.

In an embodiment, primary overflow 51*b* from at least one further rougher primary flotation stage 111*b* may be directed into a second rougher cleaner stage 210*b*, the at least one further rougher flotation stage 210*b* and the second rougher cleaner flotation stage 111*b* being in series and in fluid communication.

Underflow 42*b* from the second rougher cleaner flotation stage 210*b* may be combined into overflow 51*c* from a rougher primary flotation stage 111*c* downstream from the further rougher primary stage 111*b* from which the second rougher cleaner stage 210*b* receives primary overflow 51*b*. Alternatively, underflow 42*b* from the second rougher cleaner flotation stage 210*b* may be combined into combined overflows 51*c*-51*e* from rougher primary flotation stages 111*c*-111*e* downstream from the further rougher primary flotation stage 111*b* from which the second rougher cleaner stage 210*b* receives overflow 51*b*. Alternatively, underflow 42*b* from the second rougher cleaner flotation stage 210*b* may be combined into overflow 53 from an additional rougher cleaner stage 300 receiving primary overflow 51*c* from at least one rougher primary flotation stage 111*c* downstream from the further rougher primary flotation stage 111*b* from which the second rougher cleaner flotation stage 210*b* receives overflow 51*b*.

The additional rougher cleaner flotation stage 300 may receive primary overflow 51*c* from at least one further rougher primary flotation stage 111*c* from which primary overflow 51*c* is not received by the first or the second rougher cleaner flotation stage 210*a*, 210*b*.

Primary overflow 51*a* from a first rougher flotation stage 111*a* may be directed to a first rougher cleaner flotation stage 210*a*, and primary overflow 51*b-c* from at least two further rougher flotation stages 111*b-c* may be directed to the additional rougher cleaner flotation stage 300.

In an embodiment of the method, slurry may be subjected to at least three primary flotation stages, or to 3-10 primary flotation stages, or to 4-7 primary flotation stages.

In an embodiment of the method, primary overflow 51*a-c* from 1-3 rougher flotation stages 111*a-c*, or from 1-2 rougher flotation stages 111*a-c* may be directed to a rougher cleaner flotation stage 210*a*.

Froth flotation may be employed in at least one primary flotation stage 111 and/or at least one rougher cleaner flotation stage 210, 300.

Overflow flotation may be employed in the first rougher flotation stage 111*a*, or in the first rougher flotation stage 111*a* and in a second rougher flotation stage 111*b*.

The embodiments described hereinbefore may be used in any combination with each other. Several of the embodiments may be combined together to form a further embodiment. An arrangement, a method, a plant or a use, to which the disclosure is related, may comprise at least one of the embodiments described hereinbefore. It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A flotation arrangement for treating mineral ore particles suspended in slurry, comprising flotation cells for the separation of slurry into underflow and overflow wherein the separation is performed with the help of flotation gas, and wherein the arrangement comprises a primary flotation line, wherein underflow of each preceding flotation cell of the primary flotation line is directed to a subsequent flotation cell of the primary flotation line as infeed until a last flotation cell of the primary flotation line, the primary flotation line comprising:

a rougher part with at least two rougher primary flotation cells connected in series and arranged in fluid communication, the at least two rougher primary flotation cells comprising a first rougher primary flotation cell and a further rougher primary flotation cell downstream from the first rougher primary flotation cell, overflow from the first rougher primary flotation cell arranged to flow directly into a first rougher cleaner flotation cell arranged in fluid communication with the first rougher primary flotation cell and to receive primary overflow from the first rougher primary flotation cell for the recovery of a first concentrate; and a scavenger part with at least two scavenger primary flotation cells connected in series and arranged in fluid communication, overflow from the at least two scavenger primary flotation cells arranged to flow into a regrinding step and then into a scavenger cleaner flotation line;

wherein underflow from the first rougher cleaner flotation cell is arranged to be combined into:
  overflow from any rougher primary flotation cell downstream from the first rougher primary flotation cell; or
  combined overflows from any rougher primary flotation cells downstream from the first rougher primary flotation cell; or
  overflow from an additional rougher cleaner flotation cell arranged to receive primary overflow from any at least one rougher primary flotation cell downstream from the first rougher primary flotation cell.

2. The flotation arrangement according to claim 1, wherein primary overflow of the further rougher primary flotation cell is arranged to flow into a second rougher cleaner flotation cell arranged in fluid communication with the further rougher primary flotation cell and to receive primary overflow from the further rougher primary flotation cell for the recovery of a second concentrate.

3. The flotation arrangement according to claim 2, wherein underflow from the second rougher cleaner flotation cell is arranged to be combined:
  into overflow from any rougher primary flotation cell downstream from the further rougher primary flotation cell; or
  into combined overflows from any rougher primary flotation cells downstream from the further rougher primary flotation cell;
  or into overflow from the additional rougher cleaner flotation cell arranged to receive primary overflow from any one or more rougher primary flotation cells downstream from the further rougher primary flotation cell.

4. The flotation arrangement according to claim 1, wherein the first rougher cleaner flotation cell is arranged to receive primary overflow from the first rougher primary flotation cell, and the additional rougher cleaner flotation cell is arranged to receive primary overflow from any at least two rougher primary flotation cells downstream from the first rougher primary flotation cell.

5. The flotation arrangement according to claim 1, wherein the first rougher cleaner flotation cell is arranged in direct fluid communication with the first rougher primary flotation cell.

6. The flotation arrangement according to claim 1, wherein the first rougher cleaner flotation cell is arranged to receive primary overflow from 1 or 2 rougher primary flotation cells other than the first rougher primary flotation cell.

7. The flotation arrangement according to claim 1, wherein the rougher cleaner flotation cell is arranged to receive primary overflow from at most one rougher primary flotation cell other than the first rougher primary flotation cell.

8. The flotation arrangement according to claim 7, wherein the rougher cleaner flotation cell is arranged to receive primary overflow from no rougher primary flotation cell other than the first rougher primary flotation cell.

9. The flotation arrangement according to claim 2, wherein the second rougher cleaner flotation cell is arranged to receive primary overflow from any at least one rougher primary flotation cell other than the further rougher primary flotation cell.

10. The flotation arrangement according to claim 2, wherein the first rougher cleaner flotation cell has a volume larger than that of the second rougher cleaner flotation cell.

11. The flotation arrangement according to claim 2, wherein the second rougher cleaner flotation cell has a volume larger than that of the first rougher cleaner flotation cell.

12. The flotation arrangement according to claim 1, wherein the first rougher primary flotation cell has a volume of at least 150 m3.

13. The flotation arrangement according to claim 1, wherein the first rougher cleaner flotation cell has a volume in a range from 100 m3 to 2000 m3.

14. The flotation arrangement according to claim 2, wherein the second rougher cleaner flotation cell has a volume in a range from 100 m3 to 2000 m3.

15. The flotation arrangement according to claim 1, wherein flow of slurry between any two flotation cells in fluid connection is driven by gravity.

16. The flotation arrangement according to claim 15, wherein flow of slurry between the first rougher primary flotation cell and the further rougher primary flotation cell is driven by gravity.

17. The flotation arrangement according to claim 15, wherein flow of slurry between any rougher primary flotation cell and the first rougher cleaner flotation cell is driven by gravity.

18. The flotation arrangement according to claim 17, wherein flow of slurry between the first rougher primary flotation cell and the first rougher cleaner flotation cell is driven by gravity.

19. The flotation arrangement according to claim 2, wherein flow of slurry between the further rougher primary flotation cell and the second rougher cleaner flotation cell is driven by gravity.

20. The flotation arrangement according to claim 1, wherein primary overflow from at least one of the at least two scavenger primary flotation cells is arranged to flow directly into the regrinding step.

21. The flotation arrangement according to claim 20, wherein the overflow from the at least two scavenger flotation cells is arranged to flow directly into the regrinding step.

22. The flotation arrangement according to claim 2, wherein combined overflows from the first and the second rougher cleaner flotation cell is arranged to flow into a further processing step.

23. The flotation arrangement according to claim 1, wherein the at least two scavenger primary flotation cells comprises a last scavenger primary flotation cell, underflow from the last scavenger primary flotation cell being arranged to flow into a further processing step or to leave the flotation arrangement as tailings.

24. The flotation arrangement according to claim 22, wherein the further processing step comprises at least one step selected from: a grinding step, a conditioning step, and a flotation step.

25. The flotation arrangement according to claim 1, wherein the flotation arrangement comprises a second primary flotation line, and the first rougher cleaner flotation cell is arranged to receive overflow from a first rougher primary flotation cell of the second primary flotation line.

26. The flotation arrangement according to claim 1, wherein the flotation cells of the flotation arrangement comprise a froth flotation cell.

27. The flotation arrangement according to claim 26, wherein the at least two rougher primary flotation cells comprises a second and a third rougher primary flotation cell, and the third rougher primary flotation cell and any subsequent rougher primary flotation cell after the third rougher primary flotation cell comprise a froth flotation cell.

28. The flotation arrangement according to claim 26, wherein flotation gas is fed into any flotation cell of the flotation cells of the flotation arrangement, slurry being separated into overflow and underflow in the any flotation cell.

29. The flotation arrangement according to claim 28, wherein the any flotation cell into which flotation gas is fed comprises a mixer.

30. The flotation arrangement according to claim 26, wherein flotation gas is fed into a preparation flotation cell into which a mixer is arranged.

31. The flotation arrangement according to claim 1, wherein the mineral ore particles comprise Cu, or Zn, or Fe, or pyrite, or metal sulfide.

32. A flotation plant comprising a first flotation arrangement according to claim 1.

33. The flotation plant according to claim 32, wherein the plant comprises a second flotation arrangement according to claim 1.

34. The flotation plant according to claim 32, wherein the plant comprises the first flotation arrangement for the recovery of a first concentrate, and the second flotation arrangement for the recovery of a second concentrate.

35. The flotation plant according to claim 34, wherein the flotation cells of the primary flotation line of the first flotation arrangement and the flotation cells of the primary flotation line of the second flotation arrangement are arranged in series.

36. The flotation plant according to claim 34, wherein the plant comprises an arrangement for further treating mineral ore particles suspended in slurry so that the second concentrate is different from the first concentrate.

37. The flotation plant according to claim 36, wherein the arrangement for further treating mineral ore particles suspended in slurry comprises a grinding step, disposed between the first flotation arrangement and the second flotation arrangement.

38. The flotation plant according to claim 36, wherein the arrangement for further treating mineral ore particles suspended in slurry comprises an arrangement for the addition of flotation chemicals, disposed between the first flotation arrangement and the second flotation arrangement.

39. The flotation plant according to claim 32, wherein the first flotation arrangement is arranged to recover mineral ore particles comprising Cu, and/or Zn, and/or pyrite, and/or a metal from a sulfide.

40. The flotation plant according to claim 32, wherein the first flotation arrangement is arranged to recover mineral ore particles comprising Cu from low grade ore.

41. The flotation plant according to claim 32, wherein the first flotation arrangement is arranged to recover Fe by reverse flotation.

42. The flotation arrangement according to claim 1, wherein overflow is not arranged to flow into the first rougher cleaner flotation cell from the any at least one rougher primary flotation cell wherefrom the additional rougher cleaner flotation cell is arranged to receive primary overflow.

43. The flotation arrangement according to claim 3, wherein overflow is not arranged to flow into the second rougher cleaner flotation cell from the any one or more rougher primary flotation cells wherefrom the additional rougher cleaner flotation cell is arranged to receive primary overflow.

44. The flotation arrangement according to claim 31, wherein the mineral ore particles comprise gold sulfide.

* * * * *